United States Patent
Sells et al.

(10) Patent No.: US 10,621,557 B2
(45) Date of Patent: *Apr. 14, 2020

(54) AUTO REPAIR QUOTE PLATFORM

(71) Applicant: Top Brands Tire & Wheel, Cape Coral, FL (US)

(72) Inventors: Boake Sells, Naples, FL (US); Richard Goodwin, Cape Coral, FL (US)

(73) Assignee: Top Brands Tire & Wheel, Cape Coral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,696

(22) Filed: Sep. 18, 2019

(65) Prior Publication Data
US 2020/0013023 A1   Jan. 9, 2020

Related U.S. Application Data

(63) Continuation of application No. 15/612,181, filed on Jun. 2, 2017, now Pat. No. 10,453,037.

(60) Provisional application No. 62/344,507, filed on Jun. 2, 2016.

(51) Int. Cl.
| | |
|---|---|
| *G06Q 10/00* | (2012.01) |
| *G06Q 30/06* | (2012.01) |
| *G06Q 30/02* | (2012.01) |
| *G06Q 10/10* | (2012.01) |

(52) U.S. Cl.
CPC ......... *G06Q 10/20* (2013.01); *G06Q 10/1095* (2013.01); *G06Q 30/0283* (2013.01); *G06Q 30/0611* (2013.01)

(58) Field of Classification Search
CPC ............... G06Q 10/20; G06Q 30/0611; G06Q 10/1095; G06Q 30/0283
See application file for complete search history.

(56) References Cited

U.S. PATENT DOCUMENTS

| | | | | |
|---|---|---|---|---|
| 2001/0027481 | A1* | 10/2001 | Whyel | G06Q 10/109 709/218 |
| 2002/0111844 | A1* | 8/2002 | Vanstory | G06Q 10/06 705/7.13 |
| 2003/0028419 | A1* | 2/2003 | Monaghan | G06Q 10/06 705/7.12 |
| 2009/0254454 | A1* | 10/2009 | Gupta | G06Q 30/0601 705/26.1 |
| 2011/0161137 | A1* | 6/2011 | Ubalde | G06Q 30/0205 705/7.34 |

(Continued)

OTHER PUBLICATIONS

Tire Business, Openbay-app-improves-B2C-communication, Nov. 25, 2015, downloaded on May 30, 2019 from https://www.tirebusiness.com/article/20151125/NEWS/151129951/openbay-app-improves-b2c-communication.*

(Continued)

*Primary Examiner* — Eric W Stamber
*Assistant Examiner* — George H Walker, III
(74) *Attorney, Agent, or Firm* — Maier & Maier, PLLC

(57) ABSTRACT

An auto repair quote platform may be provided. The platform may allow a user to enter a set of parameters and request quotes from service providers based on those parameters. Service providers may also enter parameters for matching their quotes to a request. The platform may further allow a user to accept a quote and schedule an appointment with the chosen service provider.

13 Claims, 41 Drawing Sheets

(56) References Cited

U.S. PATENT DOCUMENTS

| | | | |
|---|---|---|---|
| 2012/0265615 A1* | 10/2012 | Munisamy | G06Q 30/0277 |
| | | | 705/14.58 |
| 2012/0271503 A1* | 10/2012 | Owens | G07C 5/008 |
| | | | 701/29.1 |
| 2013/0073326 A1 | 3/2013 | Jordan et al. | |
| 2013/0282511 A1* | 10/2013 | Mitchell | G06Q 30/0611 |
| | | | 705/26.4 |
| 2015/0235289 A1* | 8/2015 | Jeremias | G06F 16/951 |
| | | | 705/26.41 |
| 2015/0278822 A1* | 10/2015 | Milman | G06Q 30/016 |
| | | | 705/304 |
| 2016/0132816 A1* | 5/2016 | Lush | G06Q 10/063112 |
| | | | 705/7.14 |
| 2016/0335816 A1* | 11/2016 | Thoppae | G07C 5/0808 |

OTHER PUBLICATIONS

Selected pages from the RepairPal website dated Oc-De 2019 downloaded May 30, 2019 via web.archive.org.*

Repair PAL, selected webpages from 2015 downloaded Dec. 8, 2018 via internetarchive.com; 4 pgs.

Pat Goss, "Repair Pal", Oct. 30, 2013, at MotorWeek.org, downloaded on Dec. 8, 2018 via intermetarchive.com; 16 pgs.

Tire Business, Openbay-app-improves-B2C-communication, Nov. 25, 2015, downloaded on May 30, 2019 from https://www.tirebusiness.com/article/20151125/News/151129951/openbay-app-improves-b2c-communication; 8 pages.

Selected pages from the RepairPal website dated Oc-De 2019 downloaded May 30, 2019 via web.archive.org; 10 pages.

* cited by examiner

800

900

1350

1500

1600

1600

1500

1700

1700

AUTO REPAIR QUOTE PLATFORM

PRIORITY CLAIM

This application claims priority to U.S. patent application Ser. No. 15/612,181, filed Jun. 2, 2017; and U.S. Provisional Application No. 62/344,507, filed Jun. 2, 2016, the contents of which are herein incorporated by reference in their entirety.

BACKGROUND

Consumers seeking to have their vehicle serviced or repaired are often frustrated by a large degree of uncertainty about how much the work they would like to have done will cost. They often find that repair cost estimates for the work vary widely between vehicle repair shops, and the estimates they receive might vary significantly from the actual cost of the repairs. Further, such estimates are often not immediately available to the consumer; they may need to call into a repair shop and have a conversation with a mechanic about their problem, or may even need to take in the vehicle to each repair shop to have it looked at before an estimate will be given. Because it would be extremely time-intensive for a consumer in need of vehicle repair work to solicit estimates—much less do some level of background research about the repair shop they solicited the estimate from to ensure that it is accurate—consumers often must settle for paying significantly more than they could otherwise pay to have work done on their vehicles.

Some services have attempted to address this problem. For example, some web interfaces have been able to make available to consumers a range of estimates for a particular service, so that consumers can at least attempt to identify a good deal. Others provide users with information about how to identify the potential sources of the problem and important symptoms that they should look for, potentially streamlining the process of soliciting estimates from many different firms. However, consumers still do not have a service available to them that allows them to accurately search for and compare quotes, not estimates, from a number of different repair shops in their area without manually collecting the quotes from all of the different shops themselves.

SUMMARY

An auto repair quote platform may be provided. The platform may allow a user to enter a set of parameters and request quotes from service providers based on those parameters. Service providers may also enter parameters for matching their quotes to a request. The platform may further allow a user to accept a quote and schedule an appointment with the chosen service provider.

Such a method may comprise: storing, on a server, for each of a plurality of automotive service providers, a service provided by the automotive service provider, and quote information provided by the automotive service provider and corresponding to that particular service, wherein each stored service is selected from a set of predefined services, and wherein the quote information is individual to each automotive service provider; maintaining, by the server, an aggregator database of updated available service provider appointment data that is associated with and individual to each automotive service provider, wherein maintaining the database comprises: receiving, by the server, scheduling information for an automotive service provider, said automotive service provider scheduling information being provided in the form of available unfilled timeslots and automotive service provider operating hours, storing, by the server, in the aggregator database, the received automotive service provider scheduling information, and associating the received automotive service provider scheduling information with an automotive service provider, receiving, by the server, new automotive service provider scheduling information indicating a booked appointment, and updating, by the server, the available service provider appointment data in the aggregator database by modifying at least one unfilled timeslot to a filled timeslot indicating the booked appointment; receiving, by the server and from a user interface, a service request from a customer identifying a service selected from the set of predefined services; processing, by the server, the service request, for each automotive service provider having the identified service stored in the aggregator database, wherein processing comprises: generating, from the stored automotive service provider scheduling information, a plurality of individual start times, displaying, on the user interface, the plurality of individual start times, and determining if there is quote information corresponding to the identified service and the selected automotive service provider, and if so displaying said quote information on the user interface; receiving, on the server, a customer-selected automotive service provider and a customer-selected start time; and booking a service appointment at the customer-selected automotive service provider at the customer-selected start time and for the identified service request, wherein booking comprises: receiving, by the server and from a user interface, a customer address for an electronic communication, sending, via the server, an electronic communication providing information on the appointment, and updating the available service provider appointment data in the aggregator database by modifying at least one unfilled timeslot to a filled timeslot indicating the booked appointment.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Figure 1:
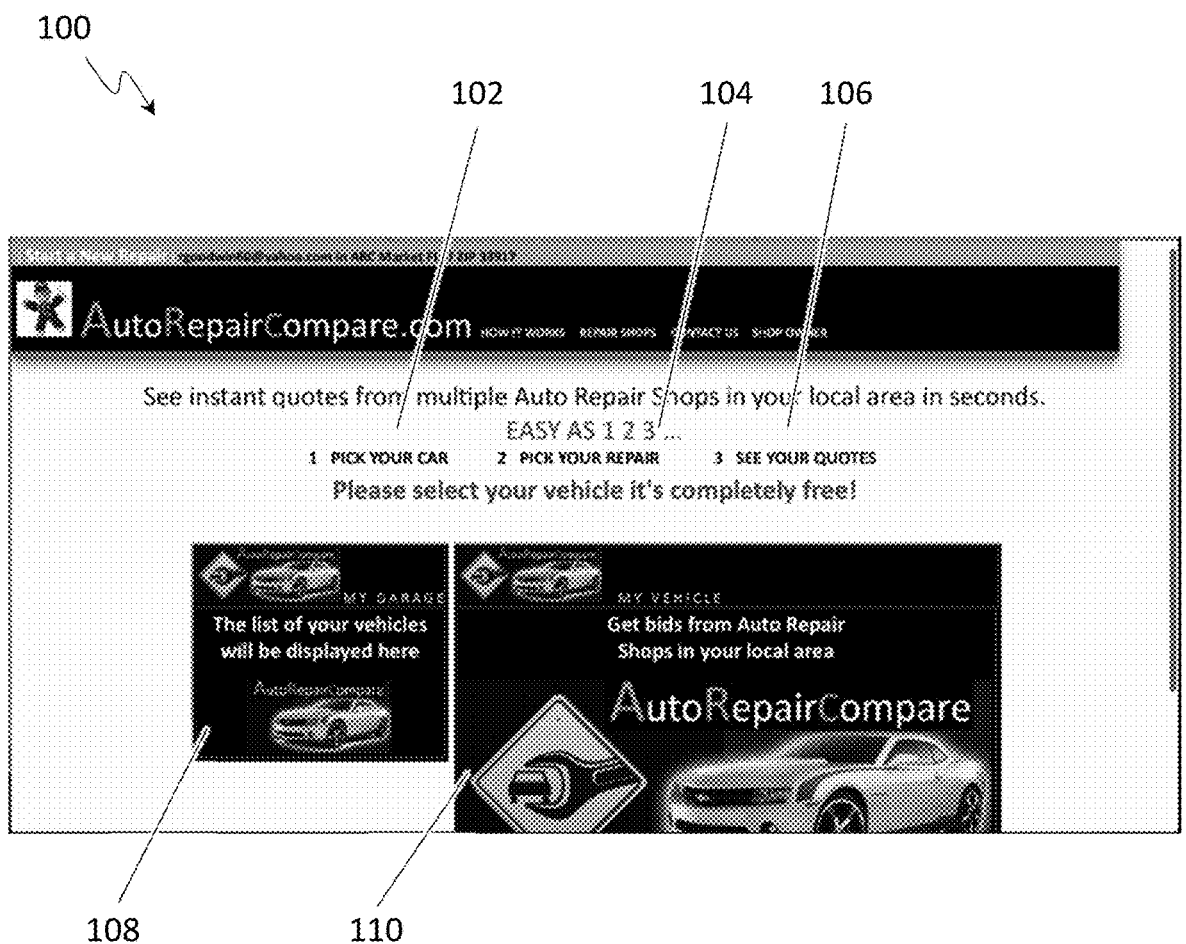
FIG. 1 shows an exemplary graphical user interface.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to an exemplary embodiment, an auto repair quote platform may be provided. The platform may provide users with quotes from specific service providers and may connect users and service providers to establish appointments. The system may utilize software implemented by a processor configured to perform the functions described herein. In some exemplary embodiments, the system may be a web-based platform and may run on cloud-based infrastructure. This may allow the platform to be scaled as required. The system may further include at least one database server optionally containing user information, vehicle and parts information, repair shop information, and/or parts supplier information. Various parties may interact with the system over a network, such as users, repair shops, and parts suppliers. Users may refer to individuals or entities seeking repair services for a vehicle. These parties may interact with the system through specific user interfaces, including websites, software applications, and mobile software applications. The system may further be integrated with users' social networking accounts. In a web-interface embodiment, there may be separate login capabilities for the different parties, such as users and shop owners.

Referring to the Figures generally, a user may optionally create an account, which may include a login to access the platform. The user may enter desired identifying information and contact information, such as an e-mail address or phone number, which may be used to confirm selections and interactions made through the platform. In some embodiments, a user may be able to use the platform without a login. In embodiments without a login, the user's historical data, such as the user's vehicle information, may not be saved.

In operation, a user may enter a set of parameters, which may define results presented through the platform. These parameters may include vehicle information, geographic information, desired service or repair information, timing information, pricing information, and other relevant information as would be understood by a person having ordinary skill in the art. Once desired parameters have been established, the platform may return a list of results comporting with the parameters. The results may include a price quote for performing the desired repair or services. The quote may be a definite price, not an estimate or price range. The user may compare the quotes and the shops offering them and may optionally accept a quote.

Detailed functions and capabilities provided by the platform may be described with reference to exemplary user interfaces of the platform as follows.

Referring to exemplary FIG. 1, an exemplary graphical user interface requesting a client to identify a vehicle and a desired service or repair ("GUI") 100 may be provided. According to an exemplary embodiment, upon navigating to the interface, a user may be presented a page similar to that provided in FIG. 1. GUI 100 may prompt the user to select a car 102, to select a desired service or repair 104, and to then see quotes from a number of auto repair shops in their local area 106. Optionally, the GUI 100 may provide the user with a list of all of the vehicles that they have registered with the site 108, and may provide the user with a list of all of the auto repair shops offering a desired service and located within a desired area 110.

GUI 100 may also prompt a user to enter login information for the site, such as an email address or username and a password. If the user does not have any login information for the site, the GUI 100 may prompt the user to create some, as well as entering any other details that may be necessary for the user to use the site. The GUI 100 may be linked to a database that stores the user's login information as well as information that the user may be capable of inputting in some embodiments, such as the user's name, the user's location, the list of vehicles that the user owns or has owned (the user's "garage"), any other contact information linked to the user, and any payment information linked to the user. When a user enters their login information, the GUI 100 software may retrieve this information from the database and populate the list of the user's vehicles 108 from the records of the user's garage, and populate the list of auto repair shops in the user's area 110 from the records of the user's location and the records of auto repair shops in that area.

Figure 2:
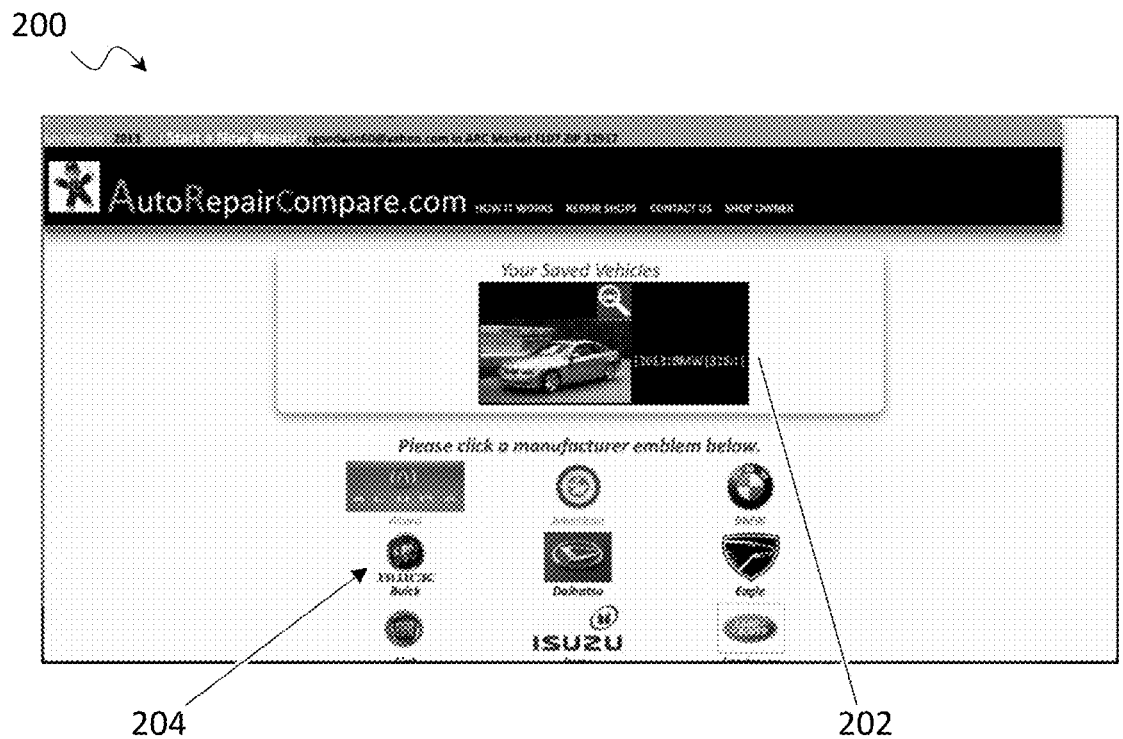
FIG. 2 shows an exemplary graphical user interface.

Referring now to exemplary FIG. 2, an exemplary GUI 200 may display a list of the user's saved vehicles and request that they enter any new vehicle information if any is available. According to one exemplary embodiment, saved vehicles 202 may be displayed as a list near the top of the GUI 200; the list of saved vehicles 202 may include the vehicles' make, model, year, color, recent service history, or any other pertinent information, and may include a picture of the vehicle or of a close match to the vehicle, for example another vehicle of the same make and model.

GUI 200 may also allow the user to select a new vehicle to be repaired or serviced, for example through a menu or from a set of icons 204. According to an embodiment in which a user is presented with a set of icons 204, icons may be presented in stages, and a first set of icons 204 may indicate the manufacturer of the vehicle in question. Clicking on the icons 204 may lead the user to a second set of icons or inputs, which may allow the user to specify more specific information about their vehicle. For example, if a user has a 2013 BMW 328*i*, they may first select the "BMW" icon from the set of icons displaying vehicle manufacturer logos 204, which may then cause the GUI 200 to display a set of BMW vehicle models that a user may select from.

Figure 3:
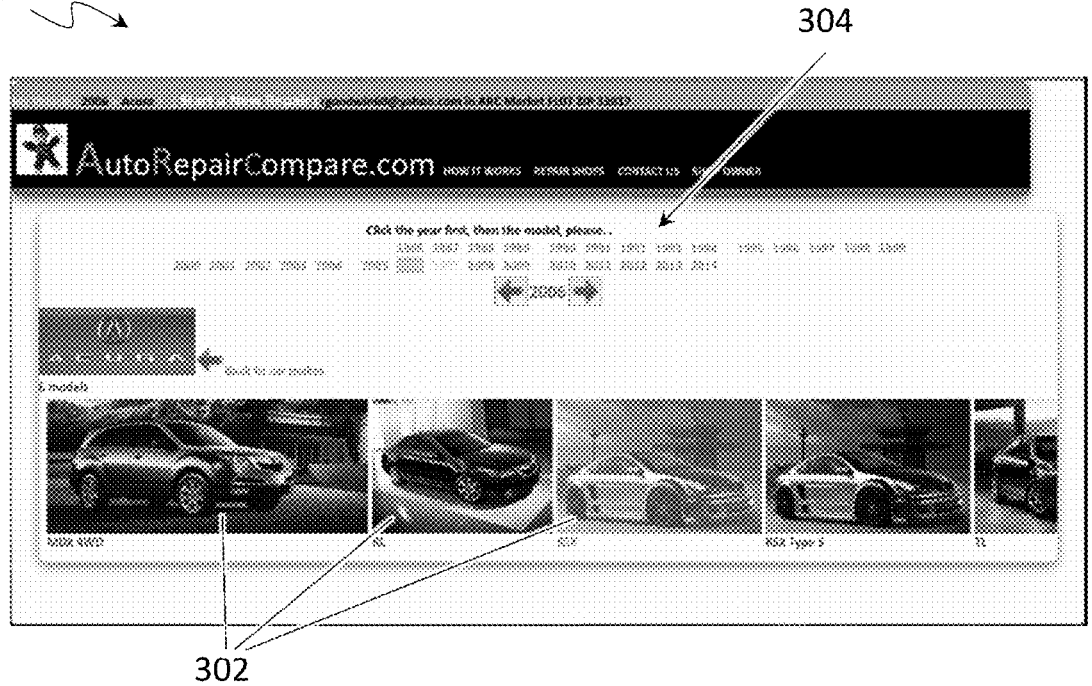
FIG. 3 shows an exemplary graphical user interface.

Referring now to exemplary FIG. 3, an exemplary GUI 300 may display a list of the vehicles made by a manufacturer 302 and may further present a list of years that the vehicle model selected was made 304. For example, in this particular case, the selected model, the Acura MDX 4WD, was manufactured from 2000 to the current time, and has model years from 2001 to the present. A user may be able to select any year from 2001 to the present 304, causing the GUI 300 to retrieve from a database a list of models produced by Acura in that year that includes the MDX 4WD. All other models produced in that year, for example the year 2006 as is the case in FIG. 3, may be displayed alongside it 302. Alternatively, a user may select the model of the vehicle 302 first, and then the year 304; for example, a user may be able to select the MDX 4WD, and may then be shown and may be able to select from any of the years in which the MDX 4WD was manufactured.

Figure 4A:
FIG. 4A shows an exemplary graphical user interface.
Figure 4B:
FIG. 4B shows an exemplary graphical user interface.

As shown in exemplary FIG. 4A-4B, a menu 402 of available repairs 404 may be presented to a user through interface 400. The repairs shown may only be repairs that are immediately available for a quote within the parameters entered by the user. For example, if no shop within a geographic parameter is currently offering alternator replacement, that service may not be presented in the menu. In some alternative exemplary embodiments, alternator replacement may still be presented in the menu, however, when selected the platform may return zero results. Additionally, an input for viewing and selecting from previous repairs 410 may be presented through interface 400. In some further embodiments, additional information 420 about menu options may be presented when a user's curser hovers over a menu item or selects an item.

Figure 5:
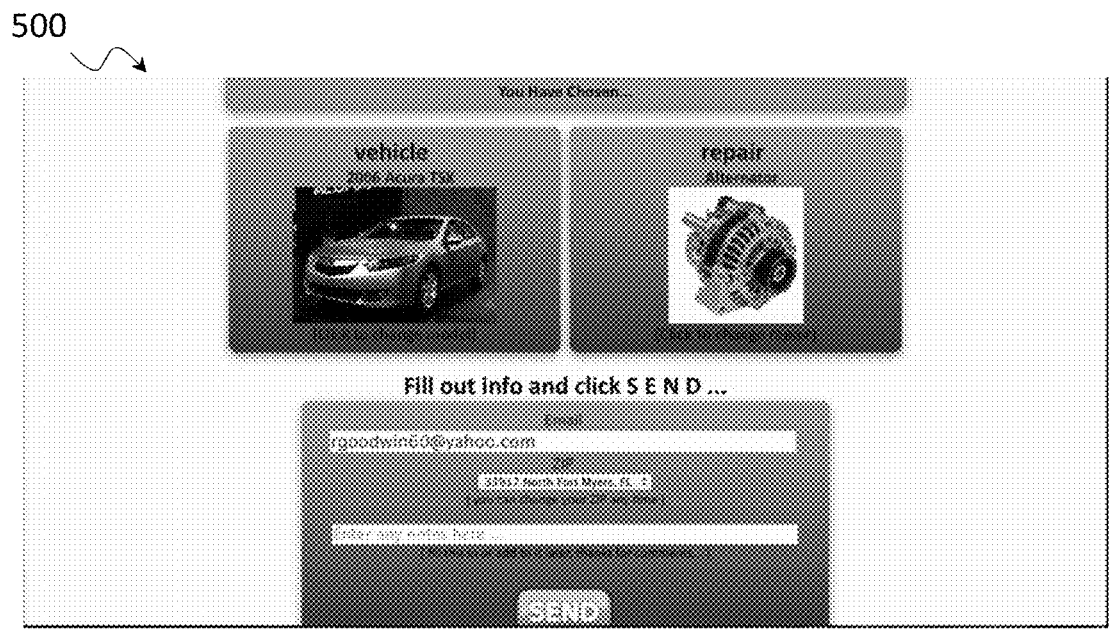
FIG. 5 shows an exemplary graphical user interface.

Now referring to exemplary FIG. 5, an interface 500 may be shown once a service has been selected. Interface 500 may allow a user to enter identifying/contact information, geographic information, and any other information or notes to be submitted with the inquiry. While the user may input identifying/contact information, such as an e-mail address, at this stage, it may still be withheld from service providers until after a service provider appointment has been selected by the user. Once a user has entered the desired information, the user may select a send or submit button to initiate the inquiry.

Figure 6A:
FIG. 6A shows an exemplary graphical user interface.
Figure 6B:
FIG. 6B shows an exemplary graphical user interface.
Figure 6C:
FIG. 6C shows an exemplary graphical user interface.
Figure 7:
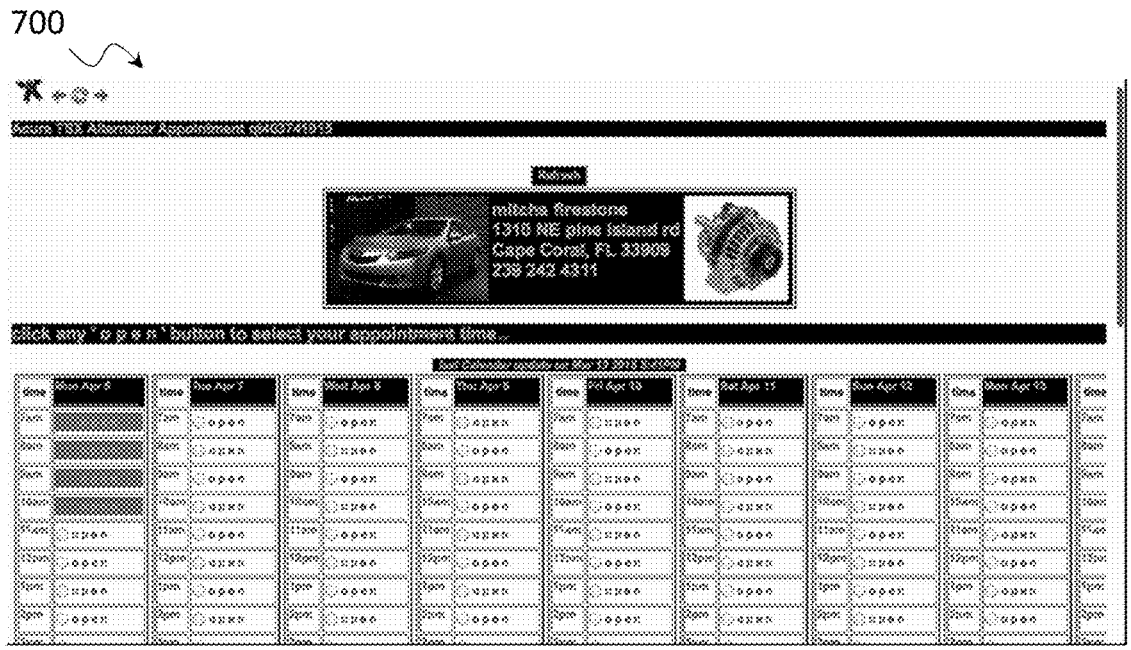
FIG. 7 shows an exemplary graphical user interface.

As shown in exemplary FIG. 6A-6C, an interface 600 may provide results to the user. The results may be in the form of a list of quotes. Interface 600 may further show a request identifier, request information, vehicle information, service/repair information, a price range encompassing all of the quotes, the number of quotes, and a description of what is included in the quote. There may also be an icon or button for refreshing the results. As shown in FIG. 6B and 6C, each quote may optionally include the name of the service provider, the quote price, a description of the services, an address and contact information for the service provider, a customer rating for the service provider, and a link to view the service provider on a map. In some further exemplary embodiments a quote may include an image of the service provider. A user may also be able to select a button or icon to view additional service provider information, which may include promotional information created by the service provider, statistical data, and other desired information, as would be understood by a person having ordinary skill in the art. In some embodiments, the link or icon may be the image of the service provider shop. Each quote may also include an acceptance link or icon for accepting a quote.

Once a quote has been accepted, a user may be directed to an appointment selection interface 700. In an exemplary embodiment, the appointment selection interface 700 may show time slots when a service provider is available to accept an appointment. The service provider may maintain the availability so that a user can book, change, or cancel an appointment in real time. In some embodiments, the appointment selection interface 700 may appear as a calendar view with days divided into timeslots of a desired duration. The duration of each timeslot or number of timeslots booked for each service may vary for different services.

Figure 8:
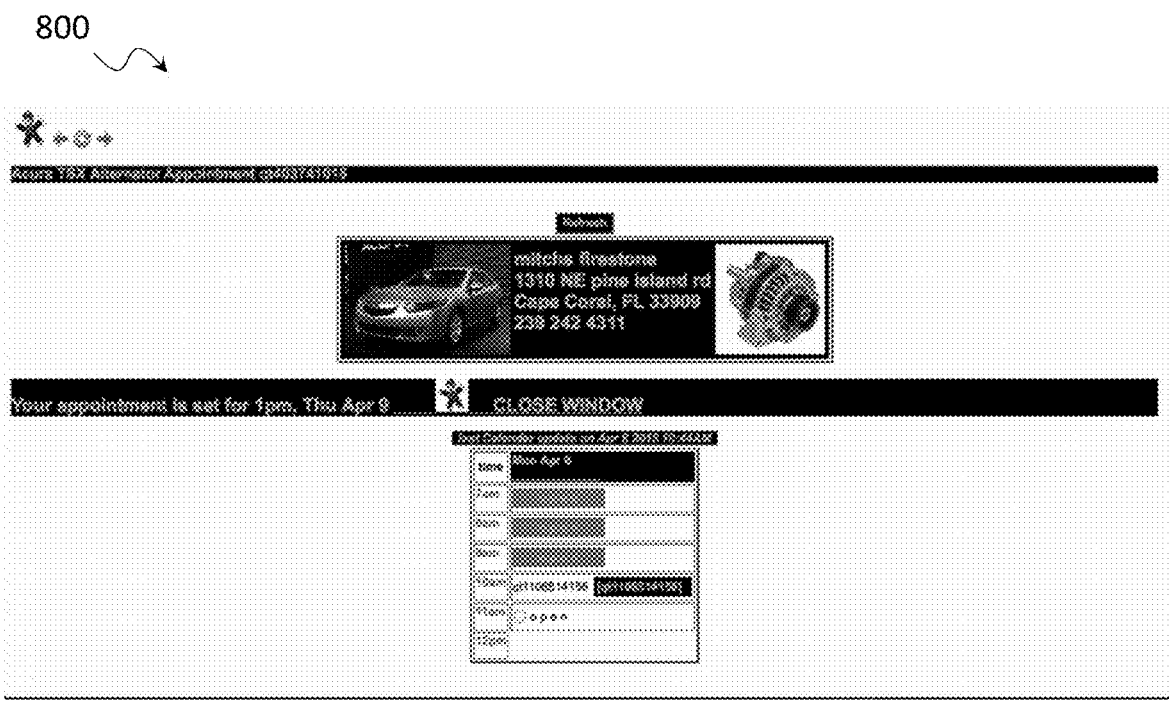
FIG. 8 shows an exemplary graphical user interface.
Figure 9A:
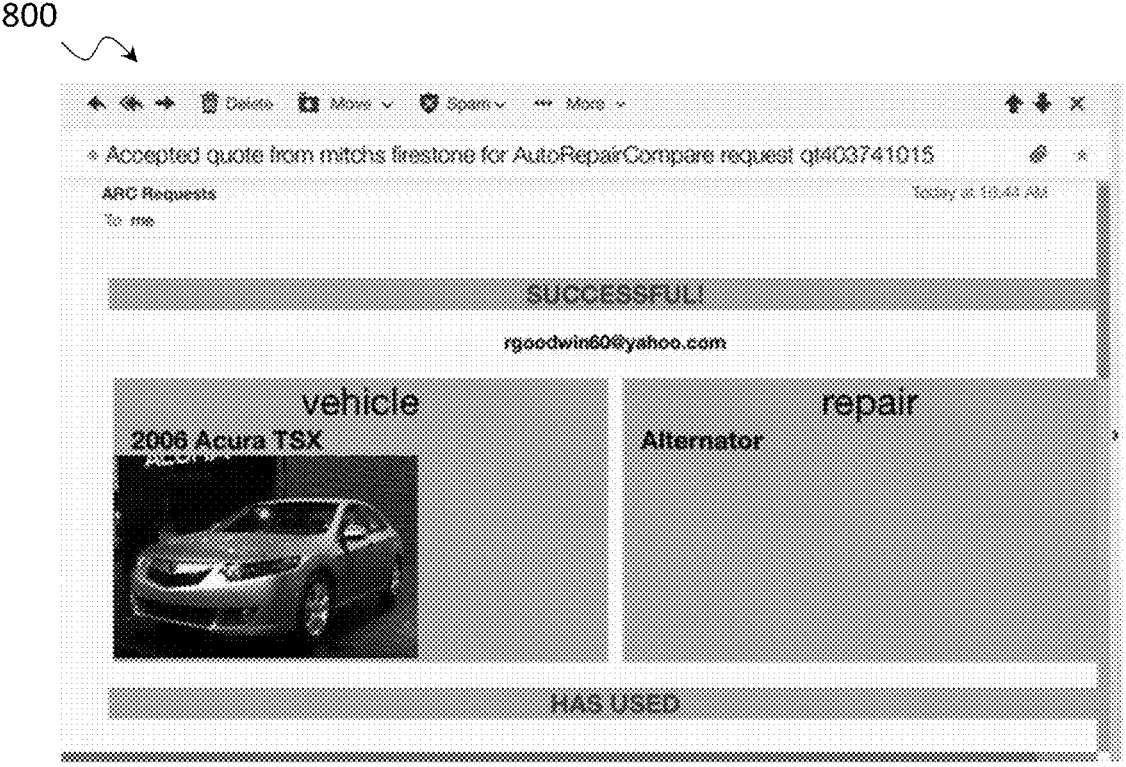
FIG. 9A shows an exemplary graphical user interface.
Figure 9B:
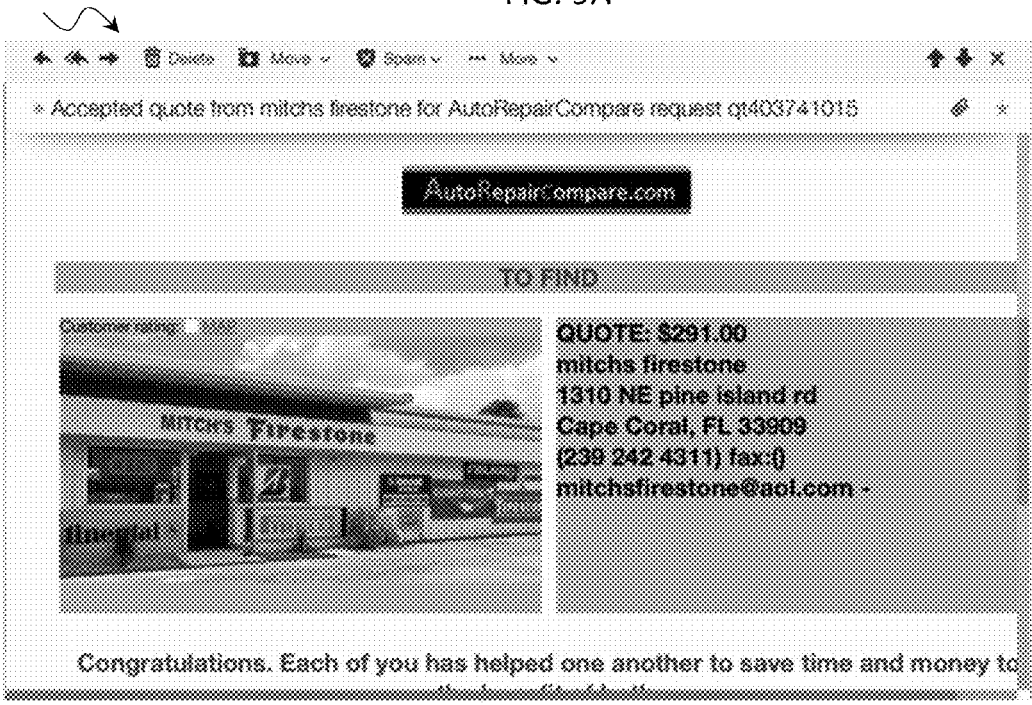
FIG. 9B shows an exemplary graphical user interface.

Exemplary FIG. 8 may show a confirmation window for a booked appointment. Additionally, a user may be sent a confirmation message 900 providing information on the appointment, as shown in exemplary FIG. 9A-9B. Message 900 may be sent in the form of an e-mail, text message, or other comparable message format as would be understood by a person having ordinary skill in the art.

Figures 10, 11:
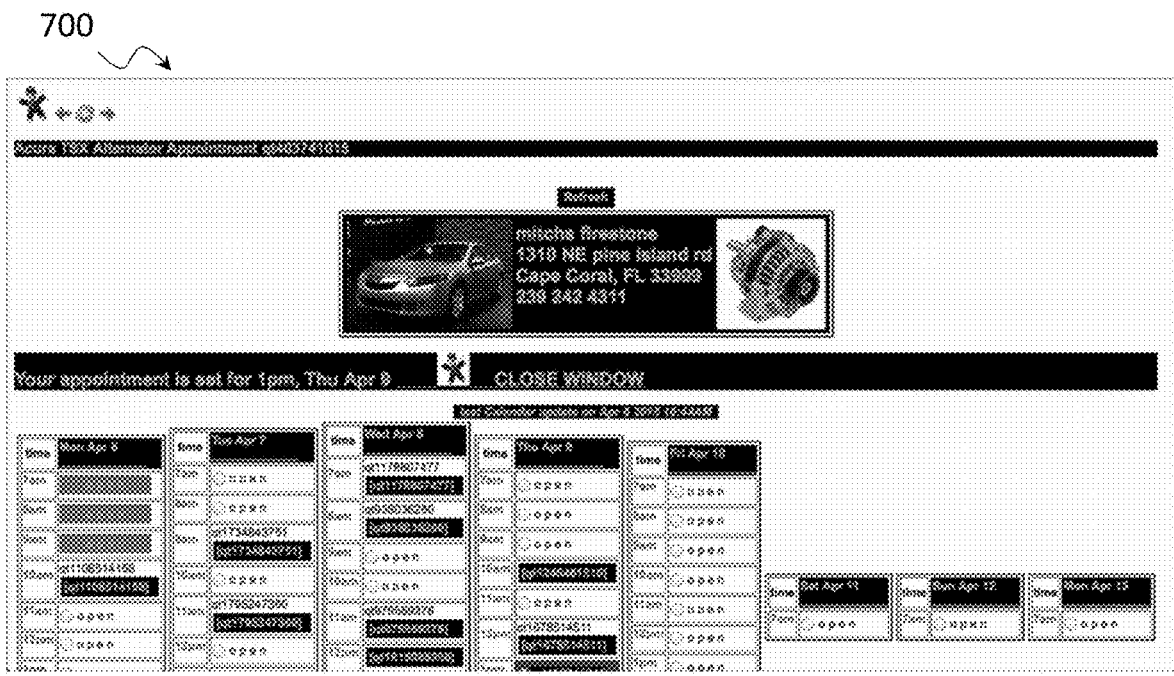
FIG. 10 shows an exemplary graphical user interface.
FIG. 11 shows an exemplary graphical user interface.
Figure 12:
FIG. 12 shows an exemplary graphical user interface.
Figure 13A:
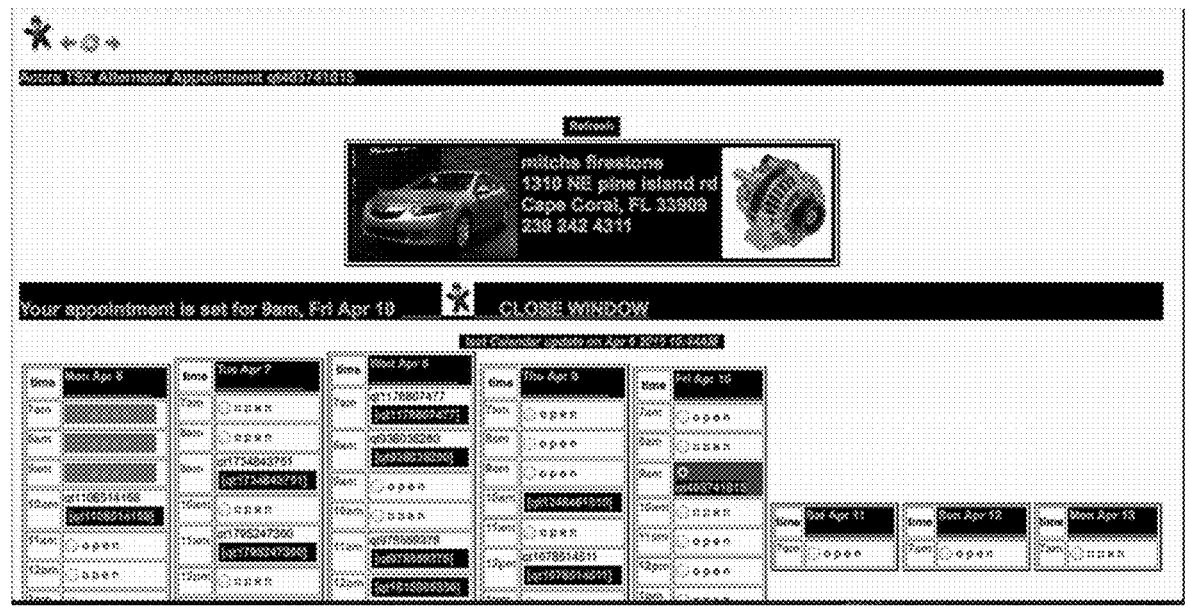
FIG. 13A shows an exemplary graphical user interface.
Figure 13B:
FIG. 13B shows an exemplary graphical user interface.

If a user desires to modify or cancel an appointment, the user may return to the appointment selection interface 700, as shown in FIG. 10. Here, interface 700 may show the current appointment selection and may allow the user to deselect, or uncheck, the appointment time and optionally select a new appointment time.

Now referring to exemplary FIG. 11-13B, a user's home interface 1100 may show their "garage", which may include any vehicles they have previously requested quotes for. A user may select a vehicle from the garage to view all requests made for that vehicle. A user may be presented with past and/or present service requests. For present service requests, an interface 1200 may show the service requested and, if applicable, the selected service provider and any appointment details. The user may additionally be provided a comment interface to add a comment to the service request, which may be viewed by a service provider. A user may also be provided an icon or link to access the quote details. Yet further, a user may be provided an icon or link to access the appointment calendar interface 1300 to view, modify, or cancel the appointment. The calendar interface 1300 may also optionally present a depiction 1350 of the service provider's shop front for recognition and assessment by a user.

Figure 14:
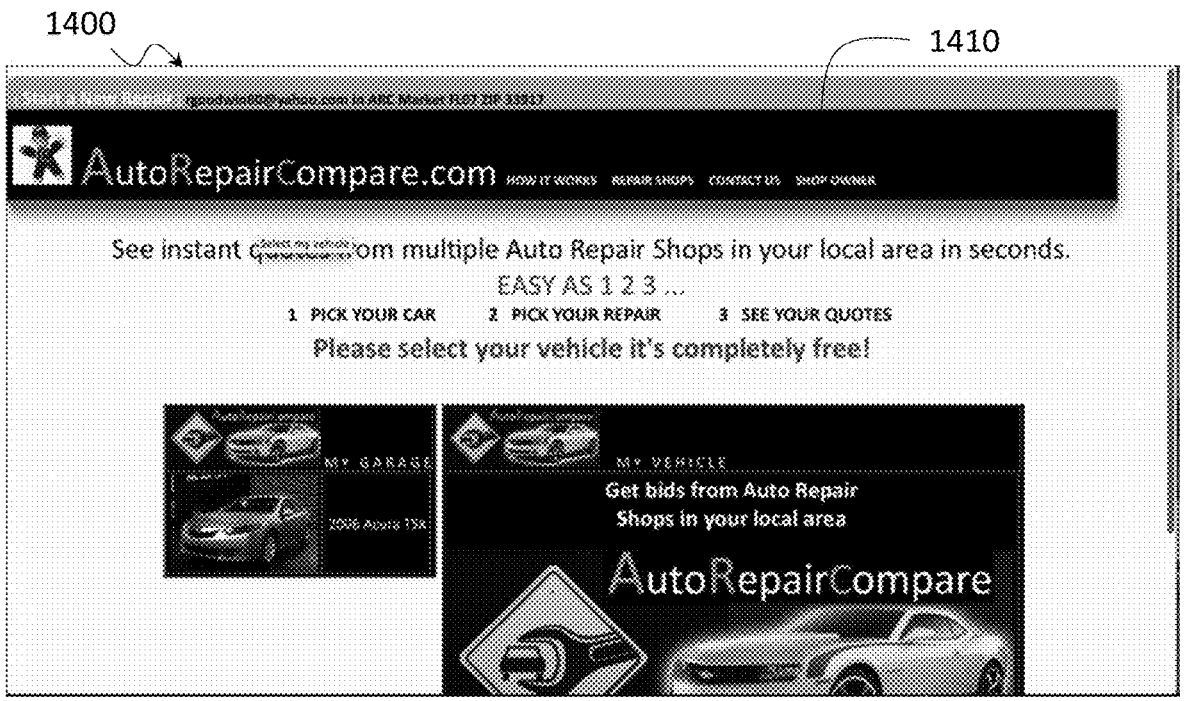
FIG. 14 shows an exemplary graphical user interface.
Figure 15A:
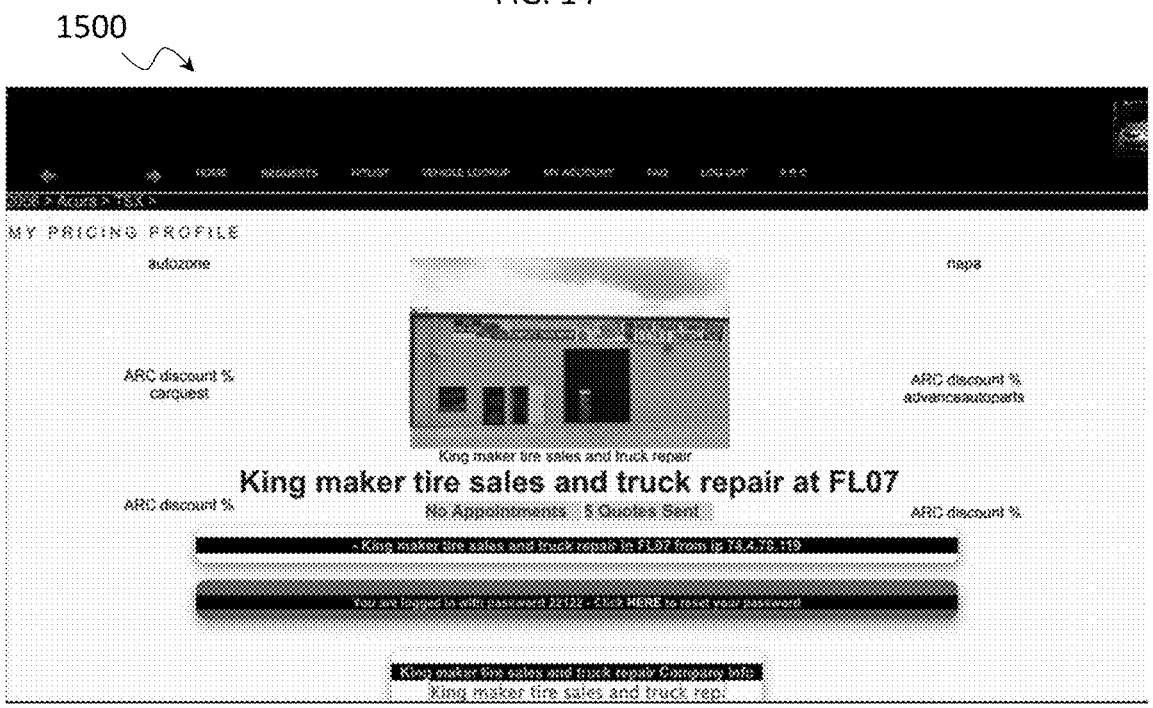
FIG. 15A shows an exemplary graphical user interface.
Figure 15B:
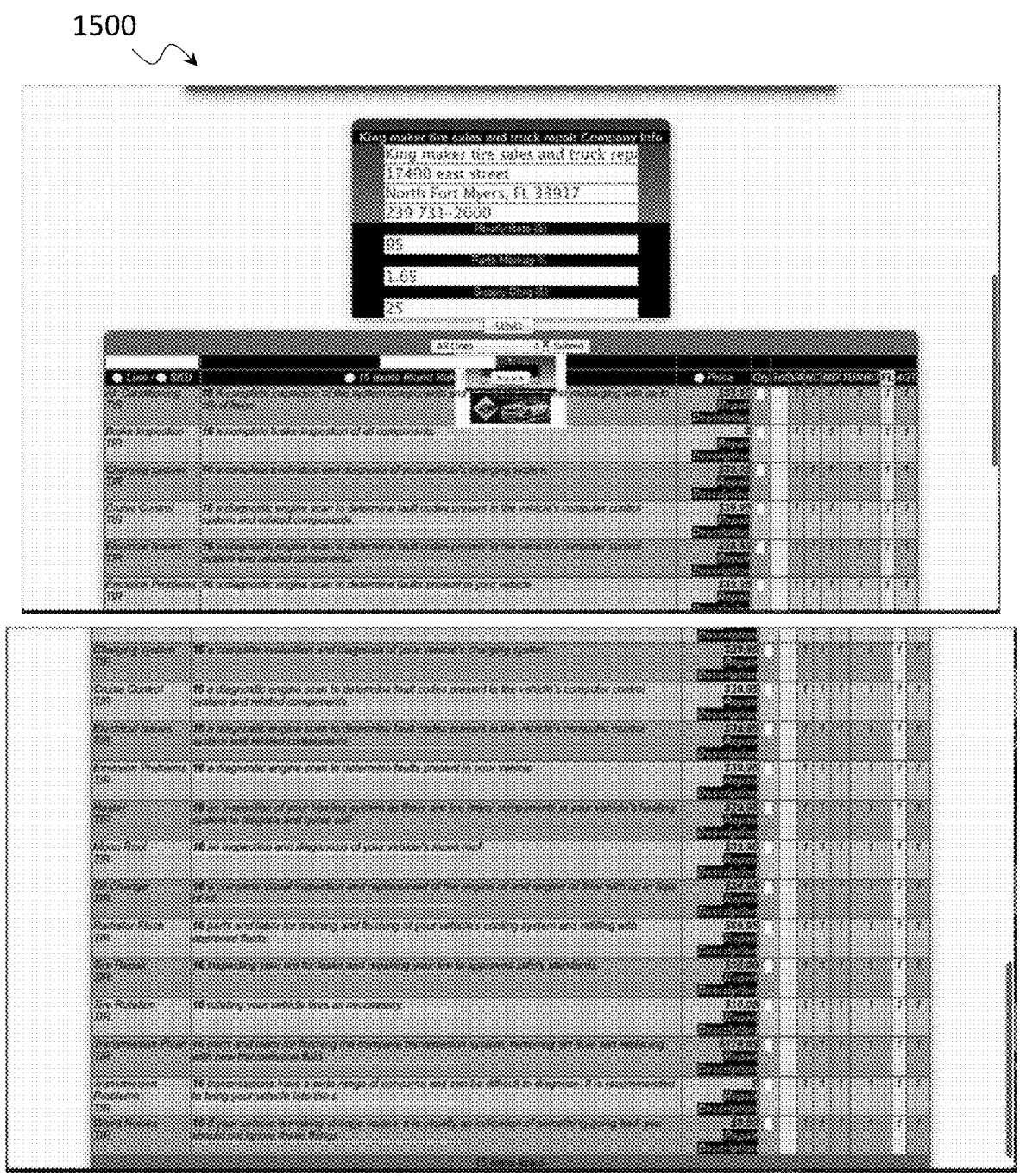
FIG. 15B shows an exemplary graphical user interface.
Figure 15C:
FIG. 15C shows an exemplary graphical user interface.

Now referring to exemplary FIG. 14-15C, a service provider may access the platform through a shop owner section 1410. A service provider may customize the service provider profile and pricing information through an interface 1500. Profile information may include additional selling statements or information on the shop, which may be accessed by a user as referenced above in relation to FIG. 6A-6C. Interface 1500 may show a number of quotes sent and a number of appointments booked. Interface 1500 may also include a price calculator, through which the service provider may input an hourly rate, a parts markup, and a supply charge. In addition to the price calculator, the service provider may set prices for a menu of flat fee services. Interface 1500 may show details and frequency for each flat fee service to assist the service provider in setting a price. The service provider may also reference the ratio of appointments booked to quotes sent in order to determine a competitive price.

Figure 16A:
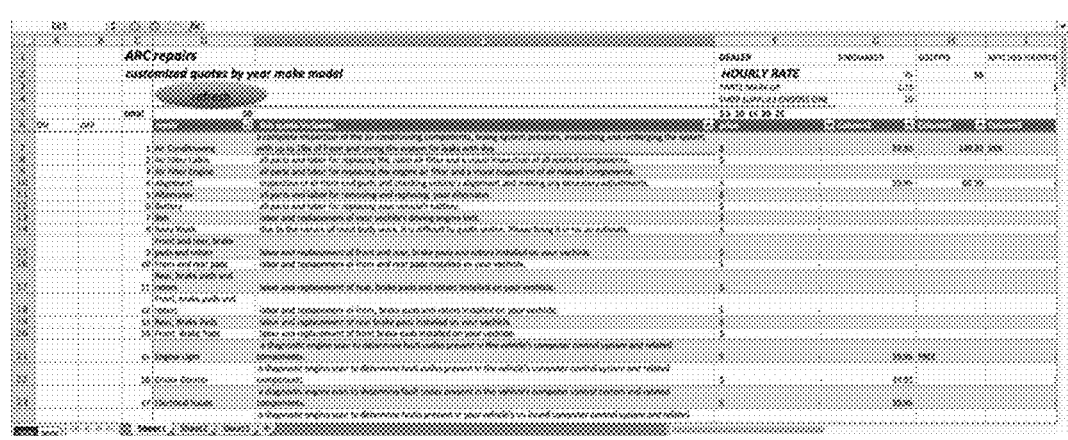
FIG. 16A shows an exemplary "light switch" interface.
Figure 16A:
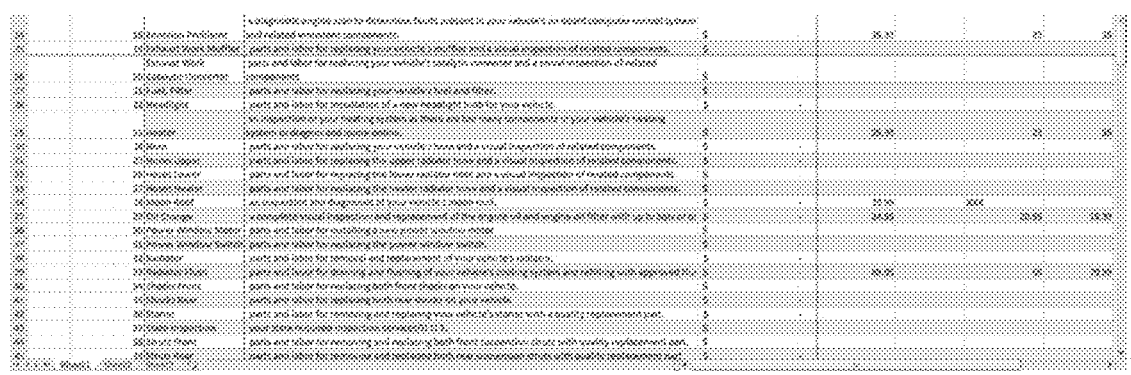
Figure 16A:
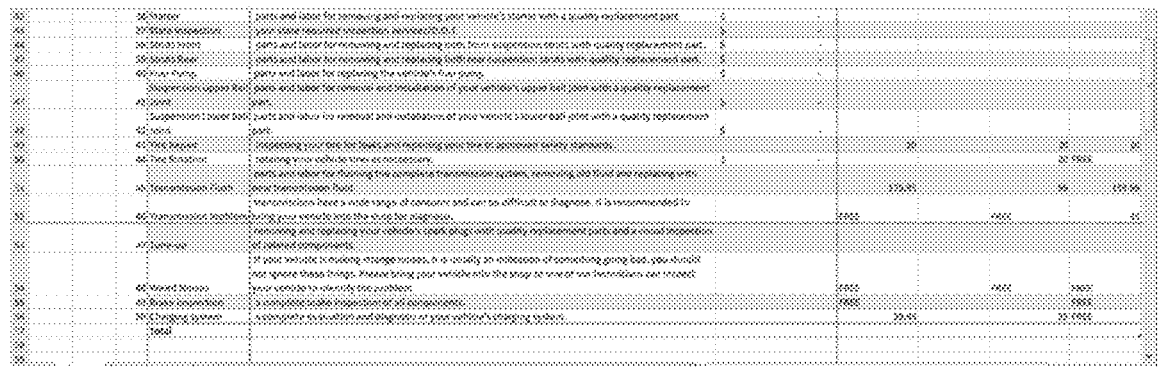
Figure 16B:
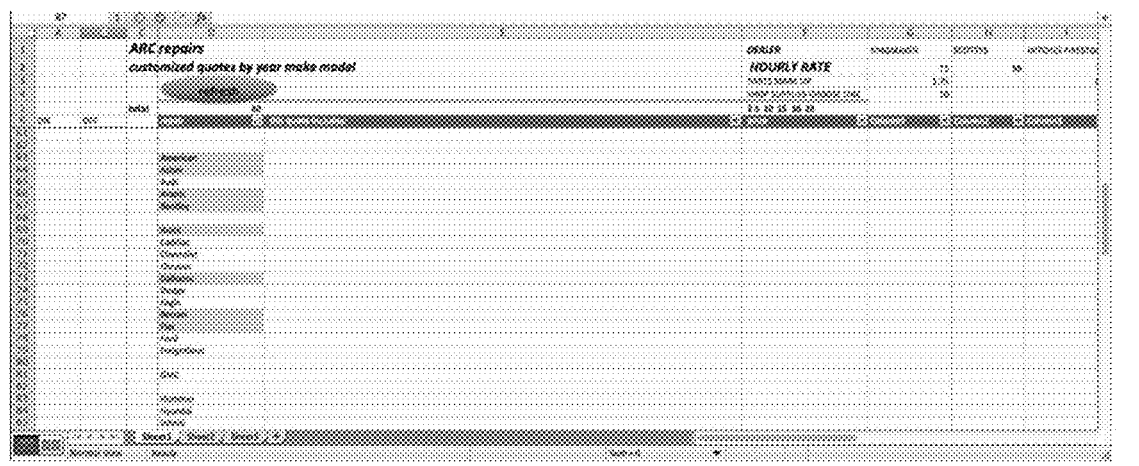
FIG. 16B shows an exemplary "light switch" interface.
Figure 16B:
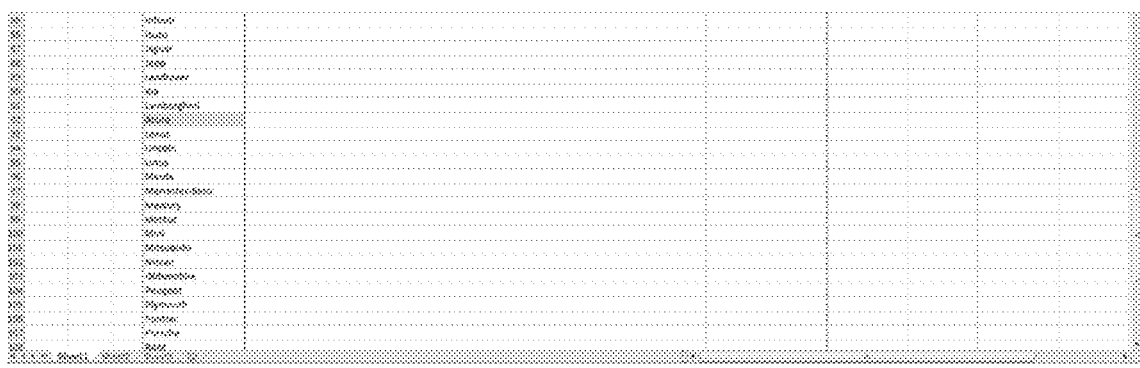
Figure 16B:
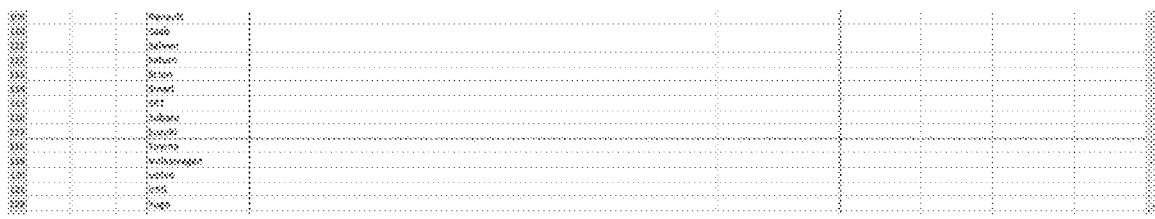

In exemplary FIG. 16A-16B, a "light switch" interface 1600, or secondary interface, through which a service provider may select repairs to offer and adjust prices, may be provided. The light switch interface 1600 may provide a set list of services that may make up a core offering for service providers. A service provider may also input an hourly rate, a parts markup, and a shop supply fee through interface 1600. In an exemplary embodiment, interface 1600 may be presented as a spreadsheet. A service provider may view the menu of services and turn the services on or off. In other words, the service provider may choose to offer a quote for that service when a user submits a service request or not offer a quote. In addition, the service provider may adjust the price of each service through interface 1600. Interface 1600 may present additional parameters that a service provider may select to limit or adjust quotes that are sent on behalf of the service provider. For example, a service provider may select certain vehicle manufacturers, models, or years that they choose to provide repairs or service for.

Figure 17A:
FIG. 17A shows an exemplary graphical user interface.
Figure 17B:
FIG. 17B shows an exemplary graphical user interface.
Figure 17C:
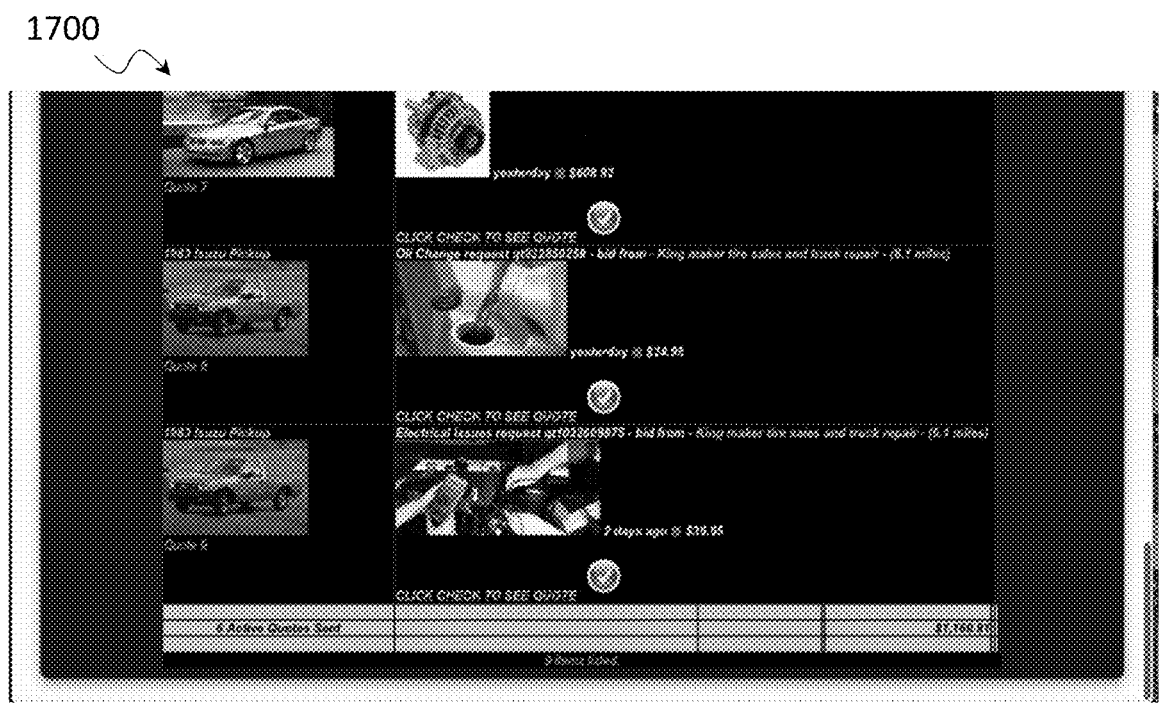
FIG. 17C shows an exemplary graphical user interface.

As referenced above, a service provider may view a number of appointments booked and a number of quotes sent through interface 1500. The service provider may select the appointments booked icon or the quotes sent icon to view a more in depth breakdown. An in depth quote breakdown interface 1700 may be presented in FIG. 17B-17C. The vehicle, service/repair, and price may be shown. A date and time may also be shown. The breakdown interface 1700 may further show cumulative data, including a total dollar amount of quotes sent. Customer information, such as contact information, may not be given to a service provider until a quote has been accepted by the customer.

Figure 18A:
FIG. 18A shows an exemplary graphical user interface.
Figure 18B:
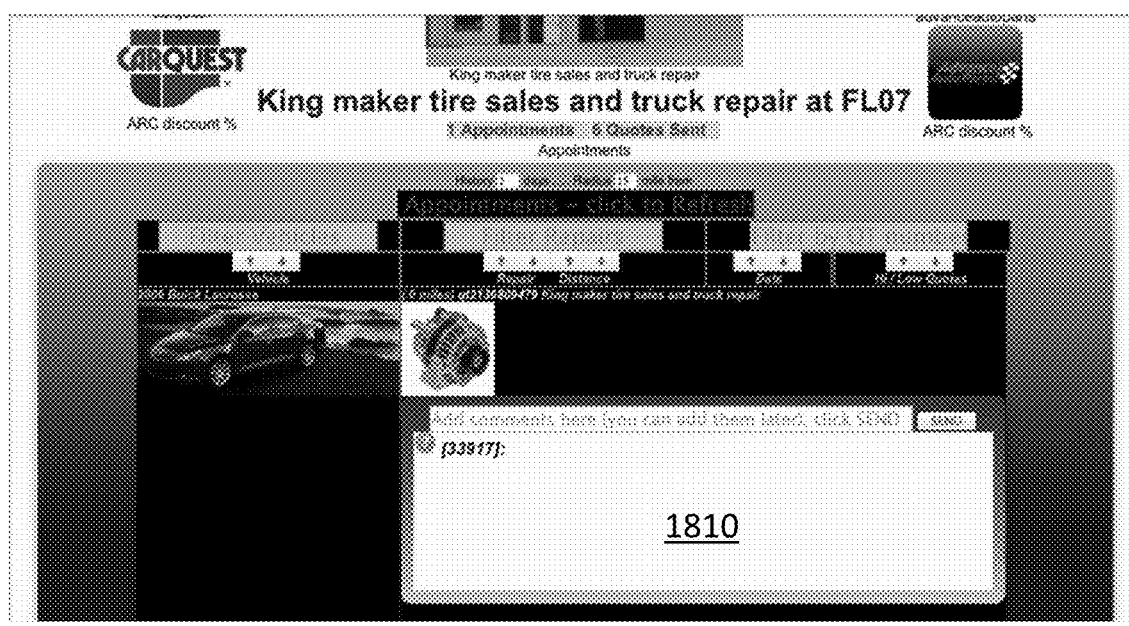
FIG. 18B shows an exemplary graphical user interface.
Figure 18C:
FIG. 18C shows an exemplary graphical user interface.

Now referring to exemplary FIG. 18A-18C, an appointment breakdown interface 1800 may be provided. An appointment breakdown interface 1800 may be accessed through interface 1500 as discussed above. Appointment breakdown interface 1800 may show each accepted appointment and may include the vehicle, the service or repair, the distance from the shop, the appointment details and identifying information of the customer/user. A service provider may also access their appointment calendar 1900 through an icon or link displayed on appointment breakdown interface 1800. In some exemplary embodiments, a service provider and a customer/user may converse through a comment interface 1810, which may be viewed by a service provider through interface 1800. A user may access the comment interface 1810 through interface 1200 shown and described in relation to exemplary FIG. 12.

Figure 19:
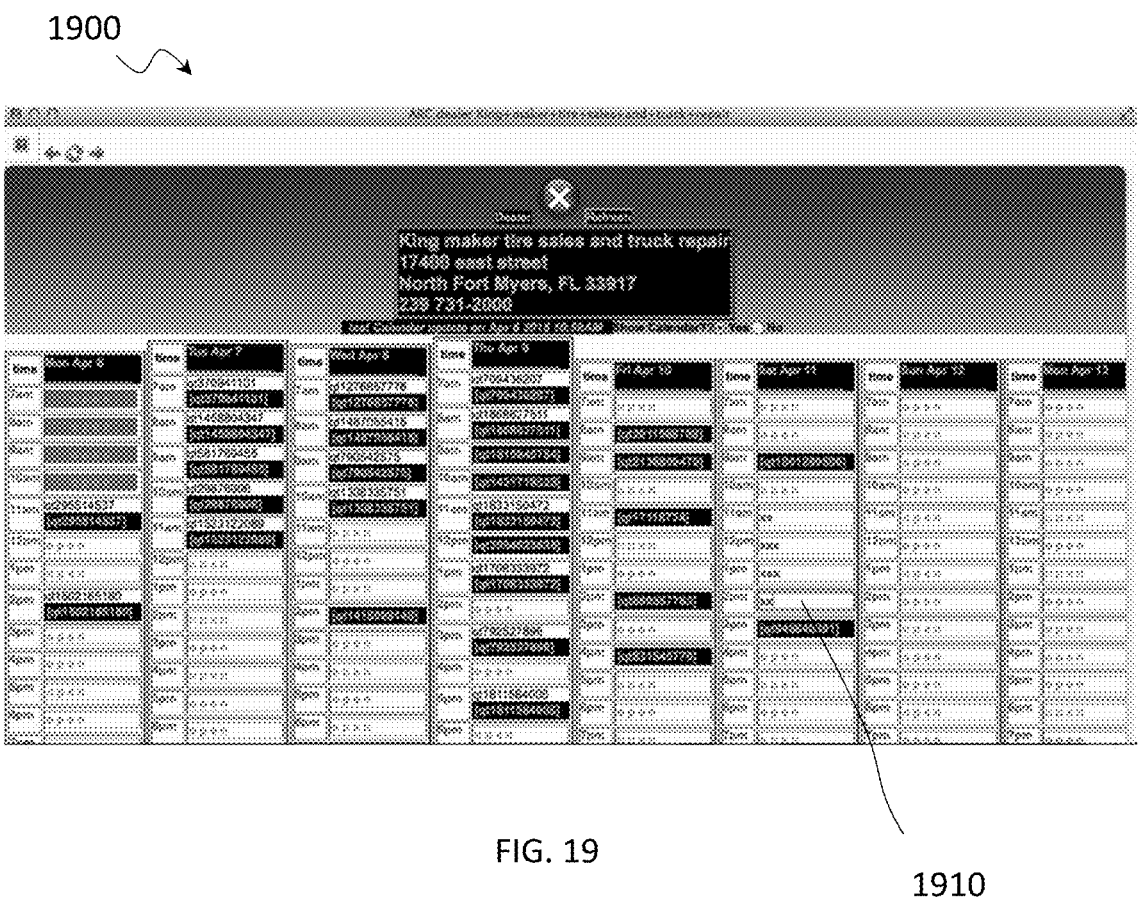
FIG. 19 shows an exemplary graphical user interface.

A service provider's appointment calendar 1900 may be shown in exemplary FIG. 19. The service provider may view their accepted appointments through the appointment calendar 1900. In some embodiments, the service provider may be able to modify or cancel accepted appointments through calendar 1900. The service provider may also block out 1910 appointment times as unavailable through calendar 1900. This may prevent a customer/user from selecting an appointment time that conflicts with a service provider's desired schedule.

Additional parameters may be set by users and service providers, as would be understood by a person having ordinary skill in the art. For example, a user and/or service provider may select a geographical distance or range within which to obtain quotes or send quotes.

In some further exemplary embodiments, the platform may interact with parts suppliers, automatically (or otherwise, such as semi-automatically based on user confirmation) ordering parts required for a service or repair to the service provider when a user selects the service provider. The parts may therefore be shipped to the service provider without requiring any action by the service provider, which may reduce time spent by the service provider and reduce delays in completing the service.

The ability to view a variety of quotes, view all available appointment times, and book an appointment without conversing with a representative of the service provider makes it possible to view and assess more information in a plausible amount of time. Additionally, service providers may utilize the platform to compare rates with competitors and therefore efficiently establish competitive rates in their marketplace.

Figure 20:
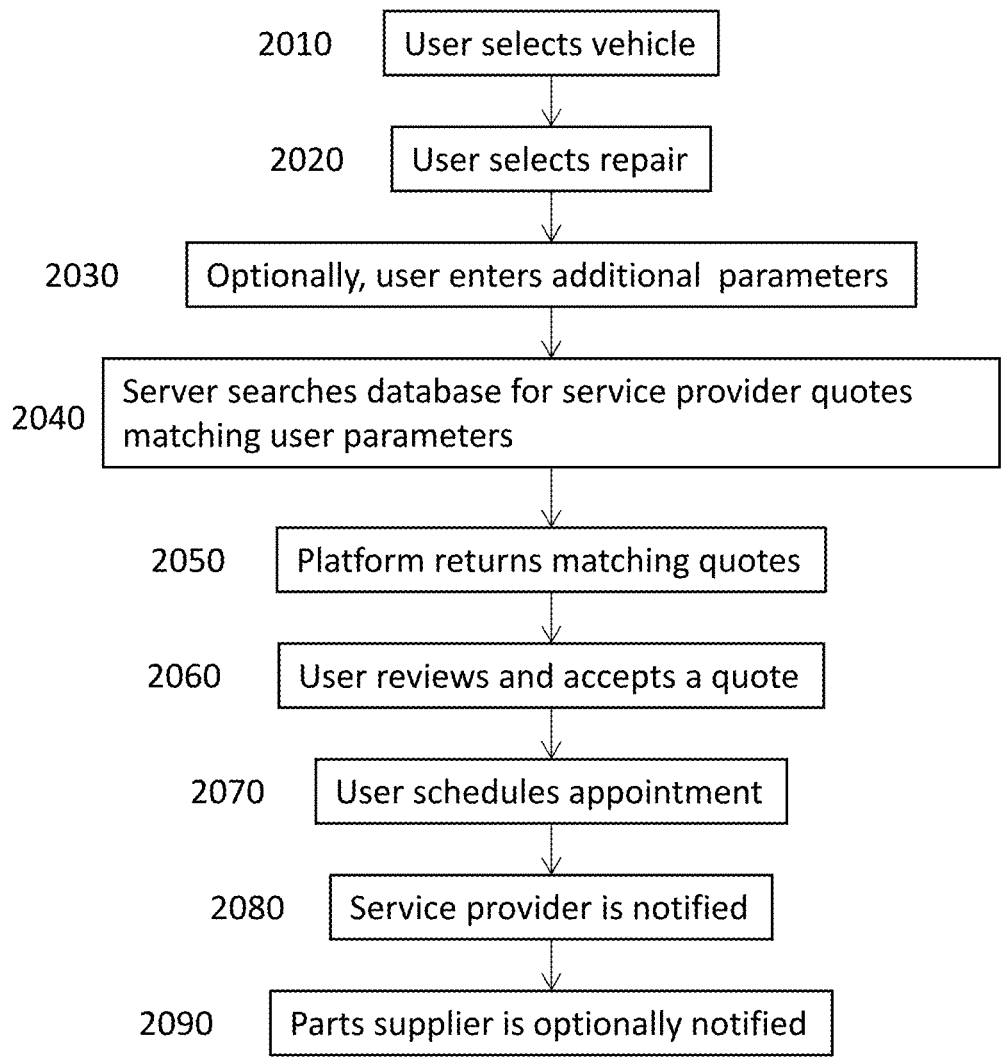
FIG. 20 shows an exemplary flow chart of a quote request and acceptance.

As shown in exemplary FIG. 20, a quote review and acceptance may broadly progress through the platform as follows. Intervening steps and selections may be present in an exemplary embodiment, as discussed through the present description. A user may select a vehicle 2010. The user may then select a repair 2020. A user may optionally enter additional parameters 2030. A platform server may search a database for service provider quotes matching the parameters 2040. Next, the platform may return matching quotes to the user 2050. The user may review and accept a quote 2060. Then, the user may schedule an appointment through the platform 2070. The service provider may be notified of the schedule appointment 2080. A parts supplier may also optionally be notified 2090, which may trigger sending of required parts to the service provider.

Figure 21:
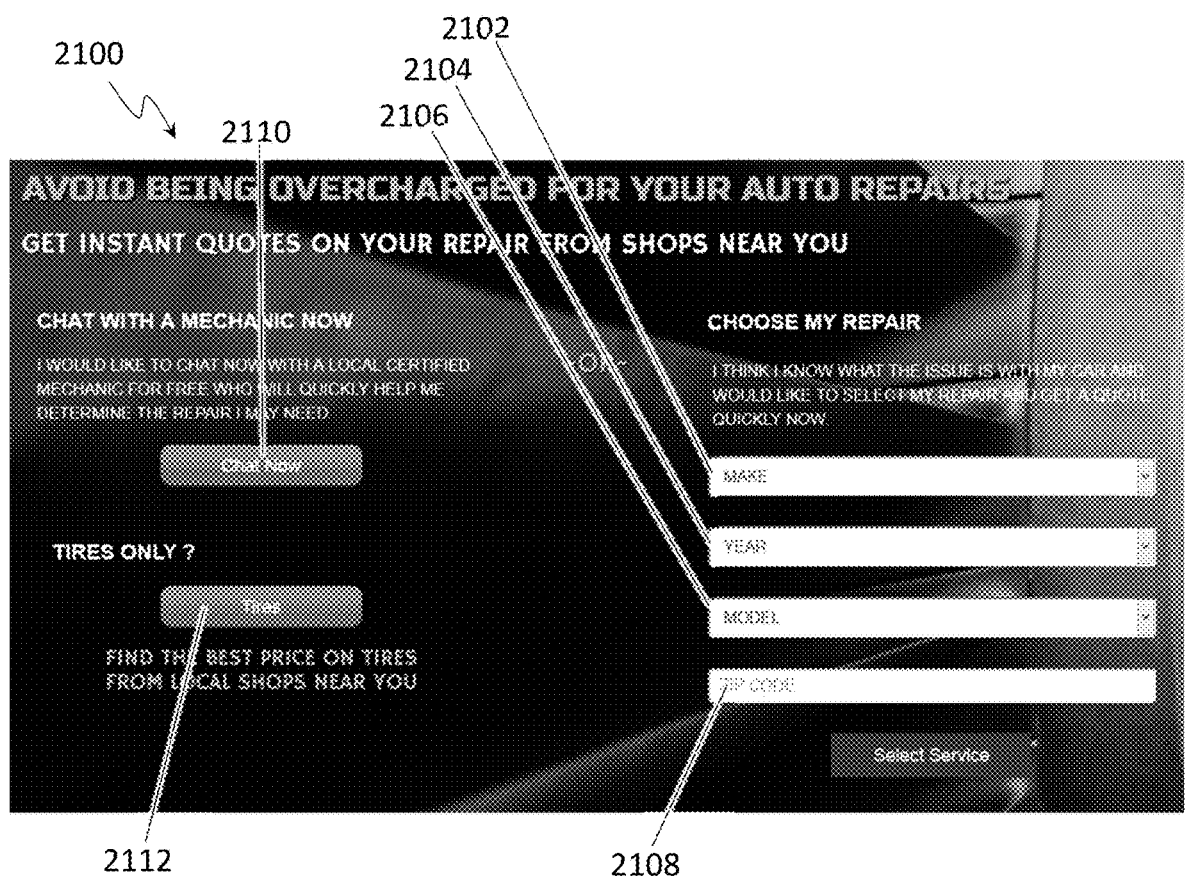
FIG. 21 shows an exemplary graphical user interface.

Turning now to exemplary FIG. 21, an exemplary graphical user interface requesting a client to identify a vehicle and a desired service or repair ("GUI") 2100 may be provided. According to an exemplary embodiment, upon navigating to the interface, a user may be presented a page similar to that provided in FIG. 21. GUI 2100 may prompt the user to select a vehicle based on certain vehicle criteria, such as the make 2102, model 2106, and year 2104 of the vehicle. In an exemplary embodiment, GUI 2100 may also prompt a user to input information about the user's location 2108 so that a more geographically-tailored set of results may be provided to the user; for example, according to an exemplary embodiment, the GUI 2100 may request information about the user's ZIP code, and may provide results in or near to the user's ZIP code or to a point within that ZIP code.

In an exemplary embodiment, other features may be provided by the GUI 2100. For example, according to an exemplary embodiment, GUI 2100 may provide a user with an option to request a live chat 2110. In an exemplary embodiment, upon selecting this option, a user may be redirected to a page having contact information of one or more mechanics who may be contacted via live chat; for example, a phone number or instant messaging address for the one or more mechanics may be provided. In another exemplary embodiment, a user may be directly connected via a chat protocol to one or more mechanics. In an exemplary embodiment, the option to request a live chat 2110 with a mechanic may specifically draw from known location information about the user, or may request location information (such as a ZIP code) of the user, and may provide the user with a connection to the geographically nearest mechanic or a selection of several geographically nearest mechanics to the user. In another embodiment, a live chat feature 2110 may solicit some information from the user about the nature of the problem and may attempt to pair the user with the geographically nearest mechanic known to specialize in fixing similar types of problems; for example, in an exemplary embodiment, a live chat feature 2110 may solicit similar information to that solicited on the GUI 2100, such as the make, model, and year of the automobile in question, or may solicit other information, such as a short description of the problem that a mechanic can briefly research before beginning the chat.

In another exemplary embodiment, a GUI 2100 may have a storefront or point-of-sale section or subsection, or may otherwise have a dialog offering items for sale 2112. For example, according to an exemplary embodiment, the GUI 2100 may provide users with the ability to purchase replacement parts, such as tires, or may provide users with the locations and names of other stores, such as local brick-and-mortar stores or even online storefronts. GUI 2100 may also provide users with the pricing information of the parts, their availability, or any other relevant information, which may be obtained by, for example, scraping the appropriate information from the stores provided in the sale dialog 2112.

Figure 22:
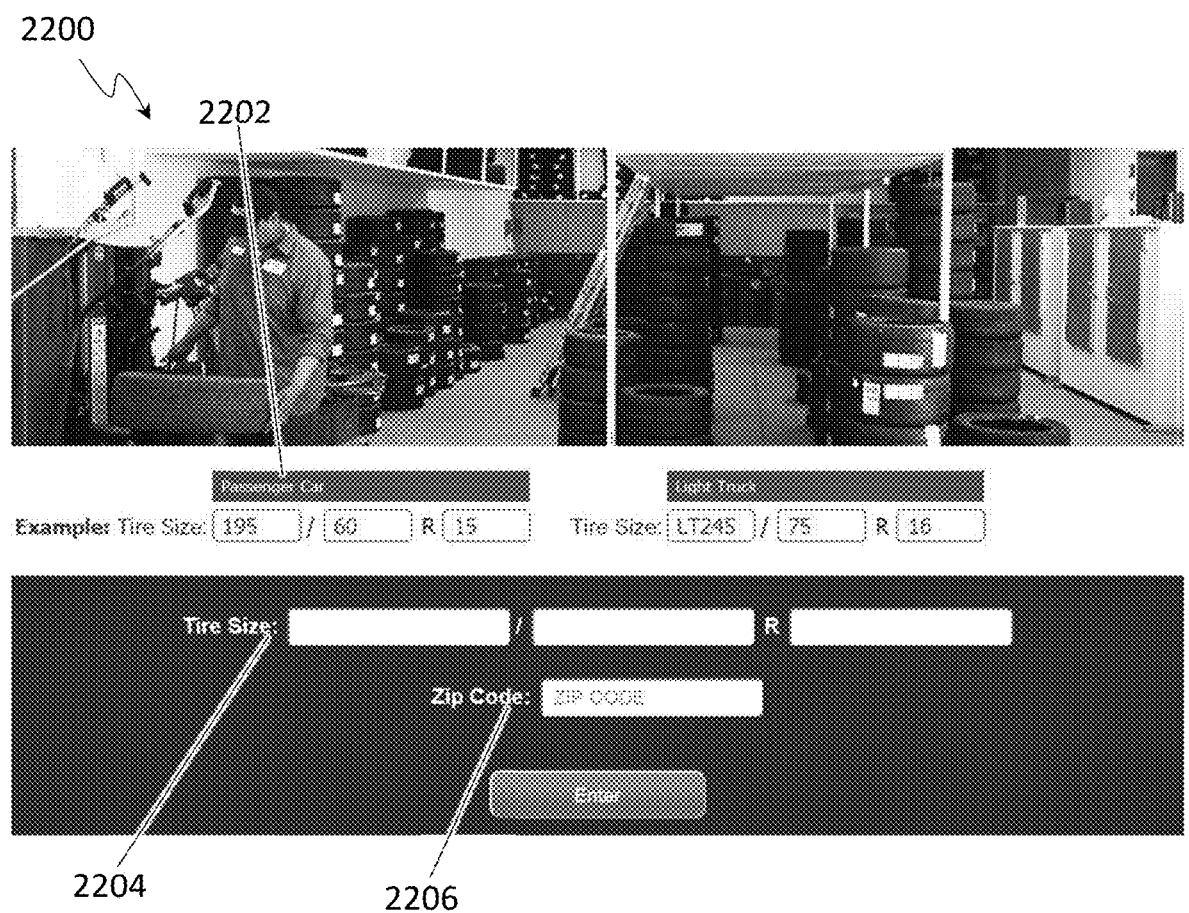
FIG. 22 shows an exemplary graphical user interface.

Turning now to exemplary FIG. 22, an exemplary GUI 2200 through which a user may locate and purchase one or more replacement parts, such as tires, through one or more physical brick-and-mortar stores that may be associated with the graphical user interface 2200. In an exemplary embodiment, a user may be provided with the option to purchase one or more replacement parts from a physical brick-and-mortar store or from an online parts vendor or other parts supplier. In an exemplary embodiment, a user may be provided with a comparison, when ordering parts, between the prices and availability of parts sourced from physical brick-and-mortar stores and the prices and availability of parts sourced from a parts vendor; this may allow the user to make more informed decisions about where to source parts, and whether to source parts from the physical brick-and-mortar stores nearby (which often will be more expensive, but will often be able to provide the part the same day if it is available, allowing the repair to be completed more quickly) or from the parts vendor (which often will be less expensive, but may require an extended period of time for shipping that may be undesirable).

In an exemplary embodiment, a user may be provided with a search dialog that may allow the user to locate tires in a specific desired size. This may include, for example, a search bar in which the user can input tire size information 2204, or another selection tool in which a user can select the appropriate tire size. Search dialog may also include, for example, a location selector 2206, which may allow the system to provide results including stores having a close physical proximity to the user. Search dialog may include one or more example tire sizes 2202, for example for specific vehicles or kinds of vehicles. In an exemplary embodiment, a user may provide information on one or more vehicles that they own to the graphical user interface 2200, or may be prompted to supply such information to the graphical user interface 2200, and the standard tire sizes of these vehicles may be provided as examples 2202.

Figure 23:
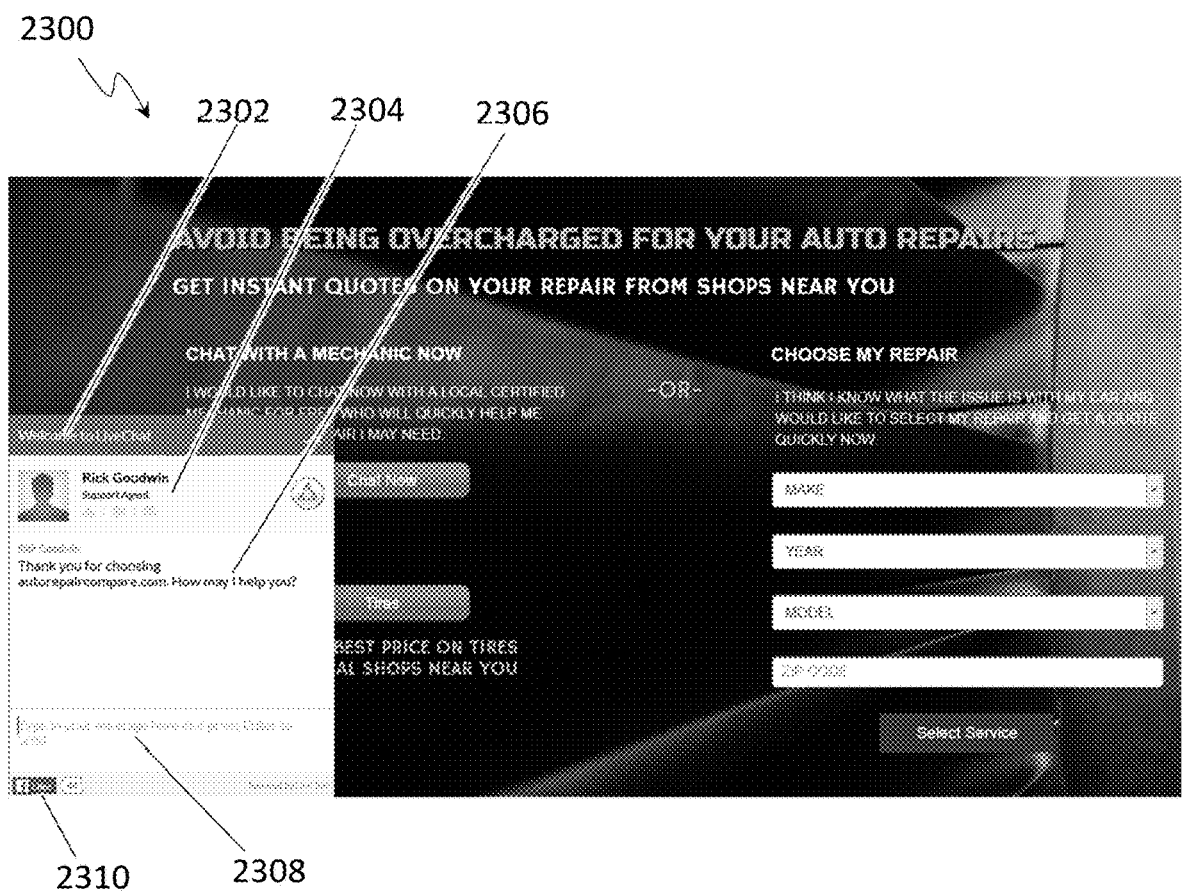
FIG. 23 shows an exemplary graphical user interface.

Turning now to exemplary FIG. 23, an exemplary GUI 2300 may include a chat window 2302 or another chat feature by which a user may be able to perform live chat with a mechanic or other expert or representative. Chat feature may include, for example, an identification of the mechanic 2304, a display of past dialog in the chat 2306, and an option to enter new information 2308. A user may also have the option to interact with the GUI 2300 by, for example, sharing material from the GUI 2300 on social media 2310.

Figure 24:
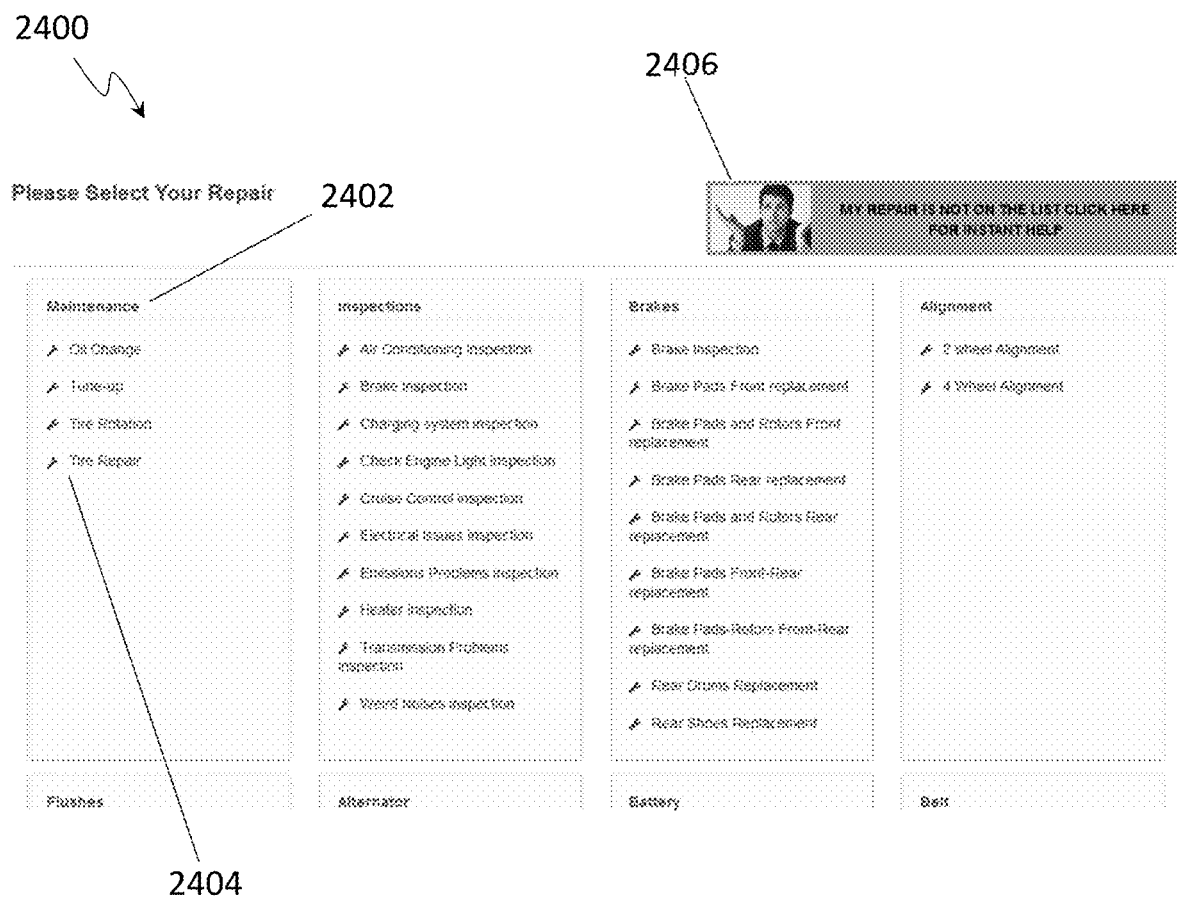
FIG. 24 shows an exemplary graphical user interface.

Turning now to exemplary FIG. 24, an exemplary GUI 2400 may include one or more repairs 2404 or other activities for which a quote may be solicited. In an exemplary embodiment, repairs 2404 may be separated out into broader categories 2402; for example, according to an exemplary embodiment, a user may be presented with a number of "maintenance" repairs for which they can solicit quotes, all under a "maintenance" tab providing a list of available options. According to an exemplary embodiment, a user may also have the option to request a quote for, or otherwise request help with, a type of repair or activity that is not provided as a preset option; a user may exercise this option by, for example, selecting a help dialog 2406.

Figure 25:
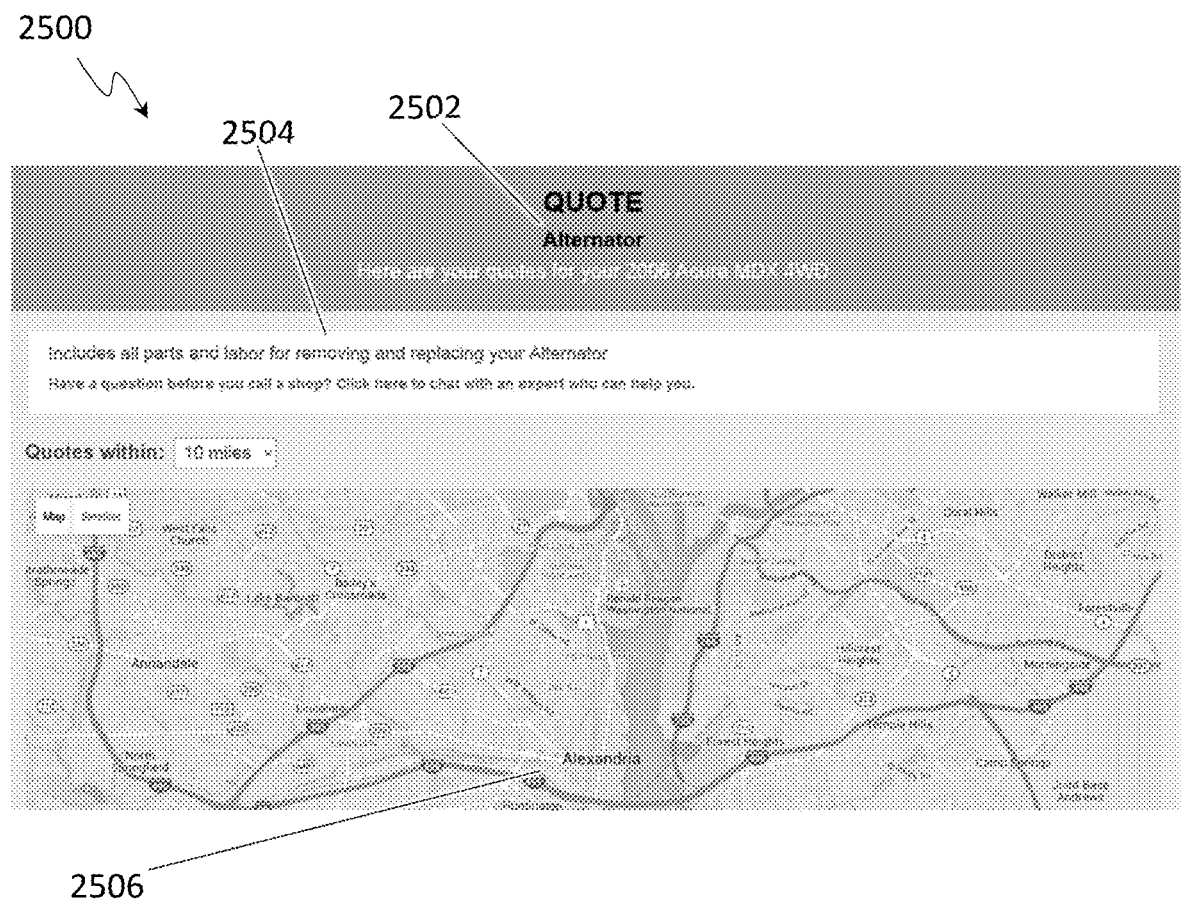
FIG. 25 shows an exemplary graphical user interface.

Turning now to exemplary FIG. 25, a GUI 2500 providing one or more quotes 2502 for a specific repair or activity to be completed may be provided. In an exemplary embodiment, once a user has selected one or more repairs or other activities to be completed, a GUI 2500 may display a quote 2502 as well as the repairs or activities to be completed, as well as one or more vehicles to which they are to be applied. A list of shops 2504 in the surrounding area that offer the repairs or activities to be completed and which have provided quotes for the service (for example, full quotes including all parts and labor) may be displayed. The list of shops 2504 may also be displayed on a map 2506 or other visualization, if desired.

Figure 26:
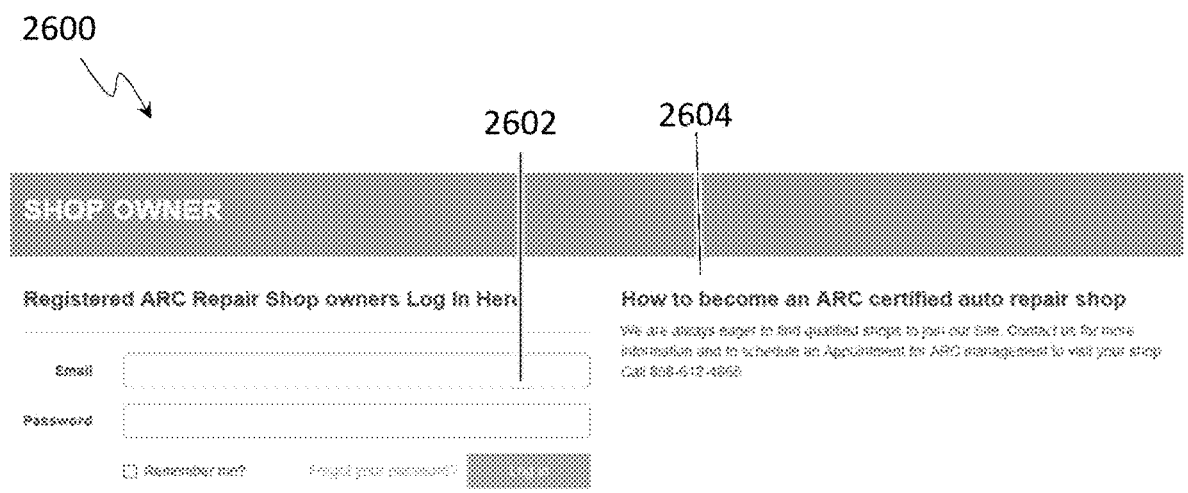
FIG. 26 shows an exemplary graphical user interface.

Turning now to exemplary FIG. 26, a GUI 2600 may display an interface through which a shop owner may prove their credentials, which may, for example, be a login screen 2602. In order to obtain credentials, according to an exemplary embodiment, a shop owner may first be vetted by an operator of the auto repair quote platform system 2604; this may require, for example, a personal visit from the operator to the shop owner to audit their practices, or any other vetting method, as desired.

Figure 27A:
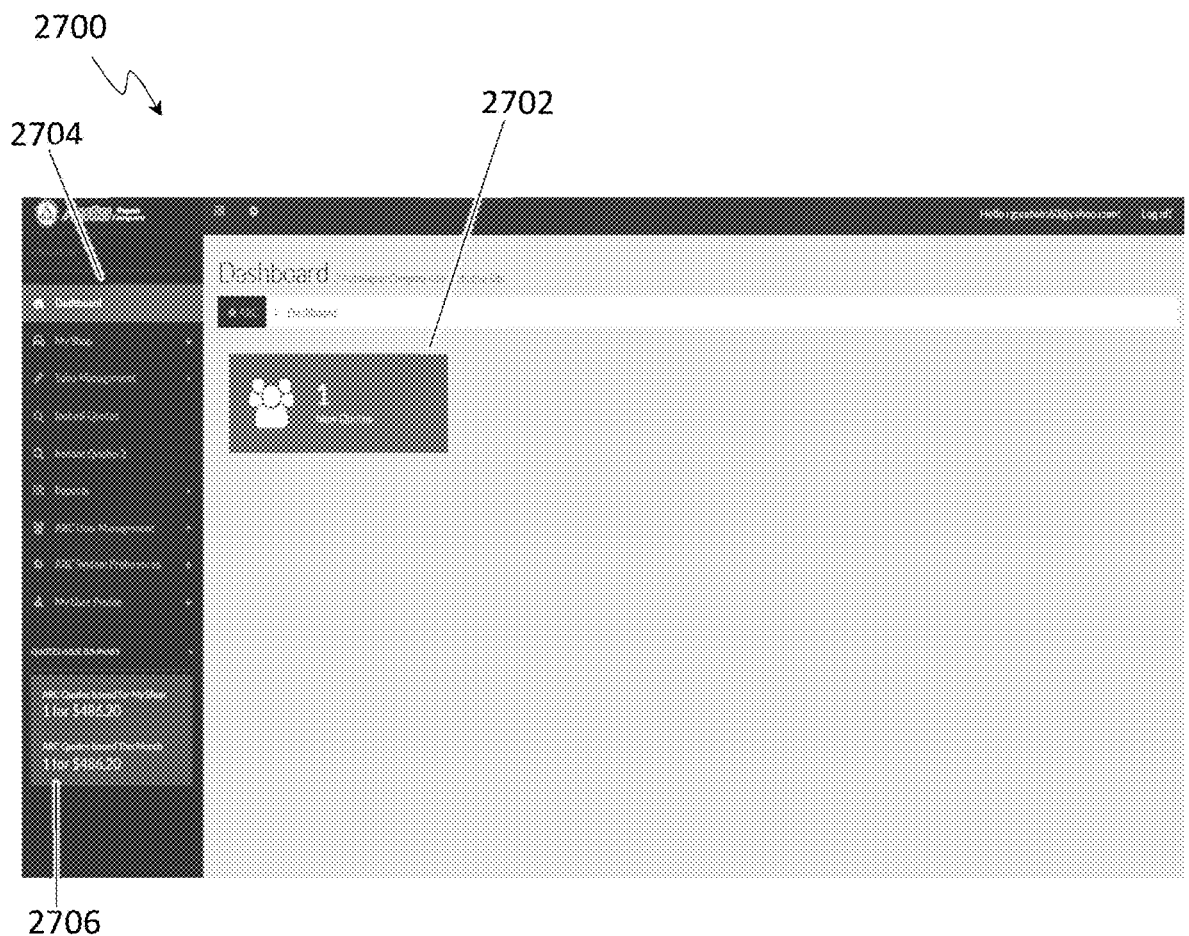
FIG. 27A shows an exemplary graphical user interface.

Turning now to exemplary FIG. 27A, a GUI 2700 may display an exemplary embodiment of a dashboard system that may be provided to a shop owner that has provided proper authentication. Dashboard may include, for example, a display of recent activity 2702, which may summarize recent interactions that customers or others have had with the ship; this may include, for example, quotes that have been recently solicited, or other information, as desired. Dashboard may also include a summary display 2706, which may depict, for example, a sum total of the value of all of the quotes that have been issued for the shop over its lifetime (or at least the time on which the shop has been associated with the auto repair quote platform), or may display the value of the quotes that have been issued within a particular period of time, for example a month.

Dashboard may also include a list of navigation links 2704, through which users may be able to navigate to other parts of the dashboard. For example, navigation links 2704 may include a link to the home dashboard page ("Dashboard"), a link to a location in which a user can manage their shop's offered services on the auto repair quote platform ("My Shop"), a link to a location in which a user can manage their shop's sales and marketing information provided on the auto repair quote platform ("Sales Management"), a link to a location in which a user can manage the instant quotes they have stored on the auto repair quote platform that are associated with their shop ("Instant Quote"), a link to an alternative location in which a user can manage the instant quotes they have stored on the auto repair quote platform that are associated with their shop and which offers different functionality to the first such location ("Instant Quote II"), a link to a location in which a report can be generated to provide information about the activity associated with the user's shop on the auto repair quote platform ("Reports"), and a link to a location in which a user can manage their user profile or user preferences ("My User Profile"). Additional functionality may be available to an administrator of the auto repair quote platform, who may have the option to make alterations to the graphical user interfaces 2700 shown to other users ("ARC System Preferences"), or may have the option to manage the users permitted to use the auto repair quote platform and add or remove users ("ARC User Management"). This may be done, for example, after a shop has been audited by the auto repair quote platform administrator; in such a scenario, a user account may be created for an owner of the shop to allow them to establish a presence on the auto repair quote platform.

Figure 27B:
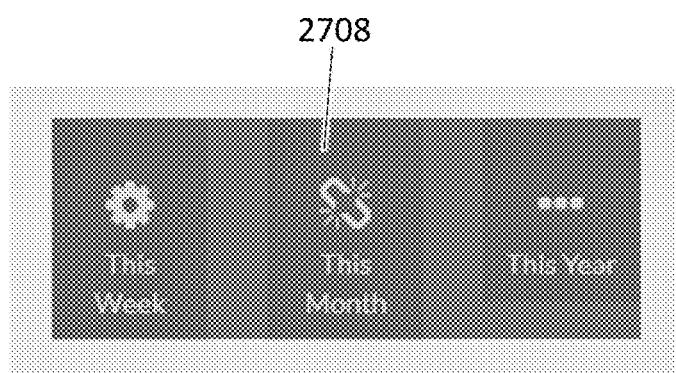
FIG. 27B shows an exemplary graphical user interface.

Turning now to exemplary FIG. 27B, the dashboard interface 2700 may offer a display of recent activity icon 2702 that, when hovered over or otherwise interacted with, allows a user to select a term of recent activity 2708, such as a week, a month, a year, or another time period, if desired. In an exemplary embodiment, the recent activity icon 2702 may be updated to reflect the specification of the user and desired time period.

Figure 28:
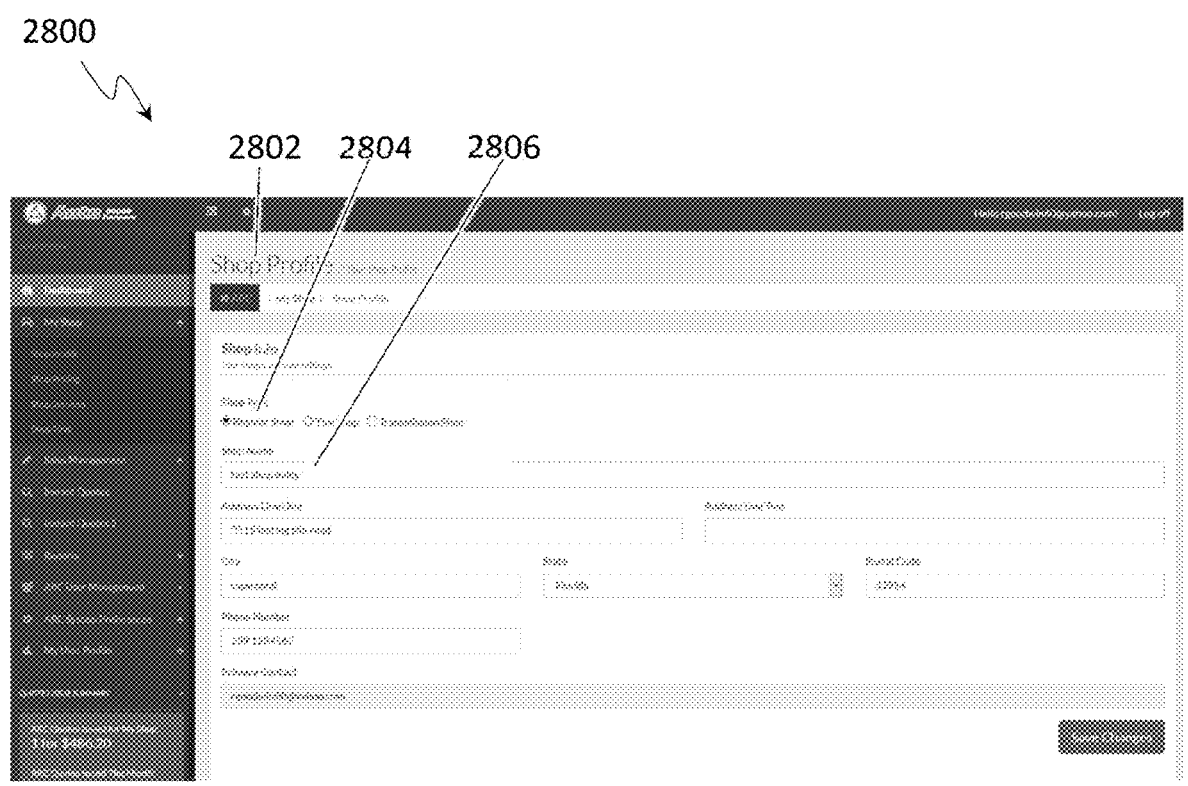
FIG. 28 shows an exemplary graphical user interface.

Turning now to exemplary FIG. 28, an exemplary dashboard interface may show an exemplary screen in which a user may be able to edit a shop profile 2802. In an embodiment, a user may be able to categorize the shop as a specific type of shop, based on, for example, the types of goods and services that may be provided by the shop. In an exemplary embodiment, a user may be able to select from a list of categories including a "regular shop," a "tire shop," and a "transmission shop," and may be able to specify one of those categories by user selection through a categorization dialog 2804. Other categories of shop, such as an "instant quote shop" or a "parts shop," or any other shops that a customer or a user of the dashboard may be able to interact with, may also be added through this dialog 2804; for example, adding a "parts shop" to the dashboard may increase the range of options that a shop owner using the dashboard may have available to them for ordering parts. A user may also be able to manually specify or edit information provided about the shop, for example by entering or editing the information in one or a plurality of text fields 2806, if desired.

Figure 29:
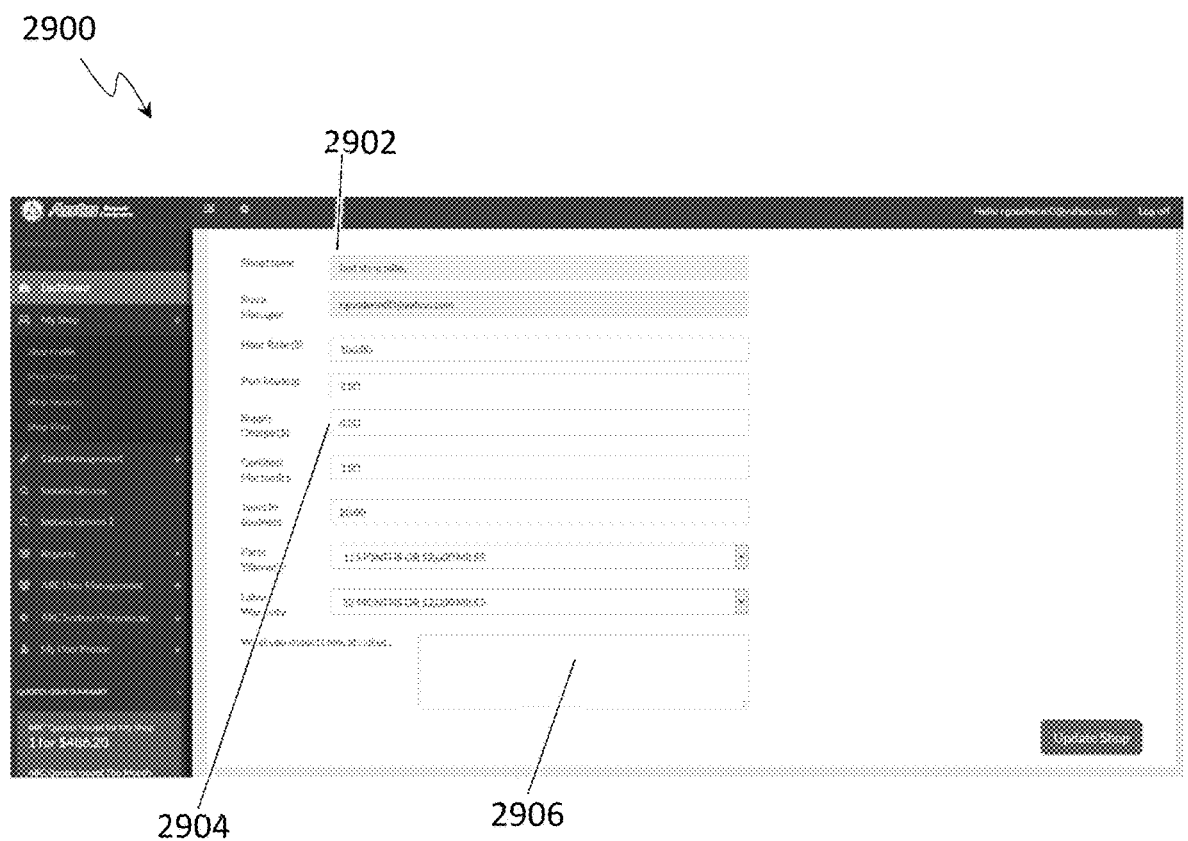
FIG. 29 shows an exemplary graphical user interface.

Turning now to exemplary FIG. 29, an exemplary dashboard interface 2900 may show an exemplary screen in which a user may be able to specify certain information relating to pricing in their shop. According to an exemplary embodiment, a user managing a particular shop profile 2902 may be able to specify, for the shop profile 2902, one or more general prices or rates for their shop 2904, which may include, for example, an hourly rate, a part markup, a supply charge, the number of certified mechanics that are available in the shop, the number of years the shop has been in business, the standard parts warranty provided by the shop, the standard labor warranty provided by the shop, and any other information that may be of relevance. A user may also have the ability to enter other information, such as a shop biography, in a text box 2906, which may cause the text to be displayed on a shop profile page. In an exemplary embodiment, some of this information may be interpreted by the auto repair quote platform and may affect the profile of the shop that may be presented to a user; for example, in an exemplary embodiment wherein a shop has three certified mechanics available in the shop, the auto repair quote platform may allow a maximum of three customers to book appointments with the shop at any one time interval.

Figure 30A:
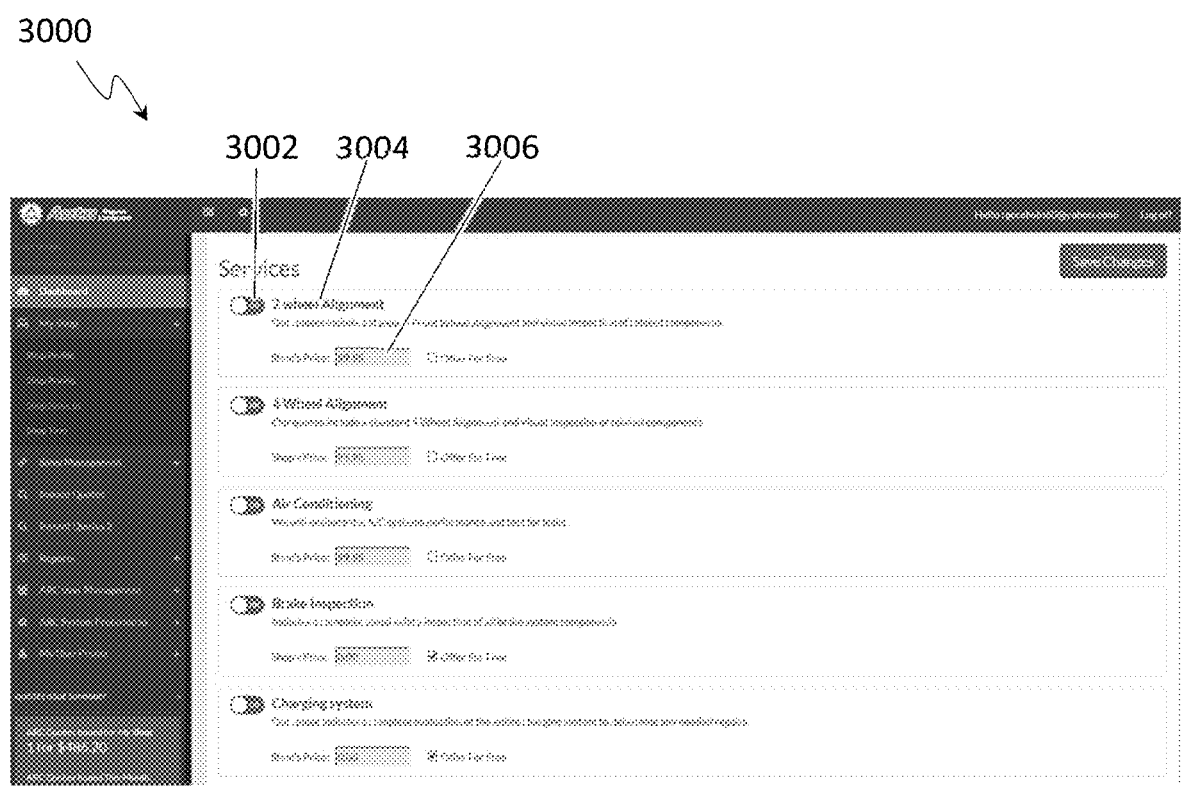
FIG. 30A shows an exemplary graphical user interface.

Turning now to exemplary FIG. 30A, an exemplary dashboard interface 3000 may show an exemplary screen in which a user may be able to specify certain information relating to the pricing and availability of particular services that may be offered by a shop. According to an exemplary embodiment, a list of services recognized by the auto repair quote platform may be provided to a user managing a shop profile on behalf of a shop. An exemplary list of services may include, for example, a title of the service and a description of what it entails 3004, and an option to enable or disable the service 3002, which may be used to associate or disassociate a particular shop profile with a particular service, and may be used to indicate to the auto repair quote system that a particular shop does or does not provide the service in question), and an option to provide a fixed price for the service 3006. In an exemplary embodiment, a shop may also be able to select to provide the service for free, for example by specifying a cost of zero or by selecting an "offer for free" option. In another exemplary embodiment, a shop may be able to provide logic, such as "buy one get one free" logic, in which the service will be provided for free or at a different cost than normal, after which the auto repair quote system may incorporate that logic into the shop's profile.

Figure 30B:
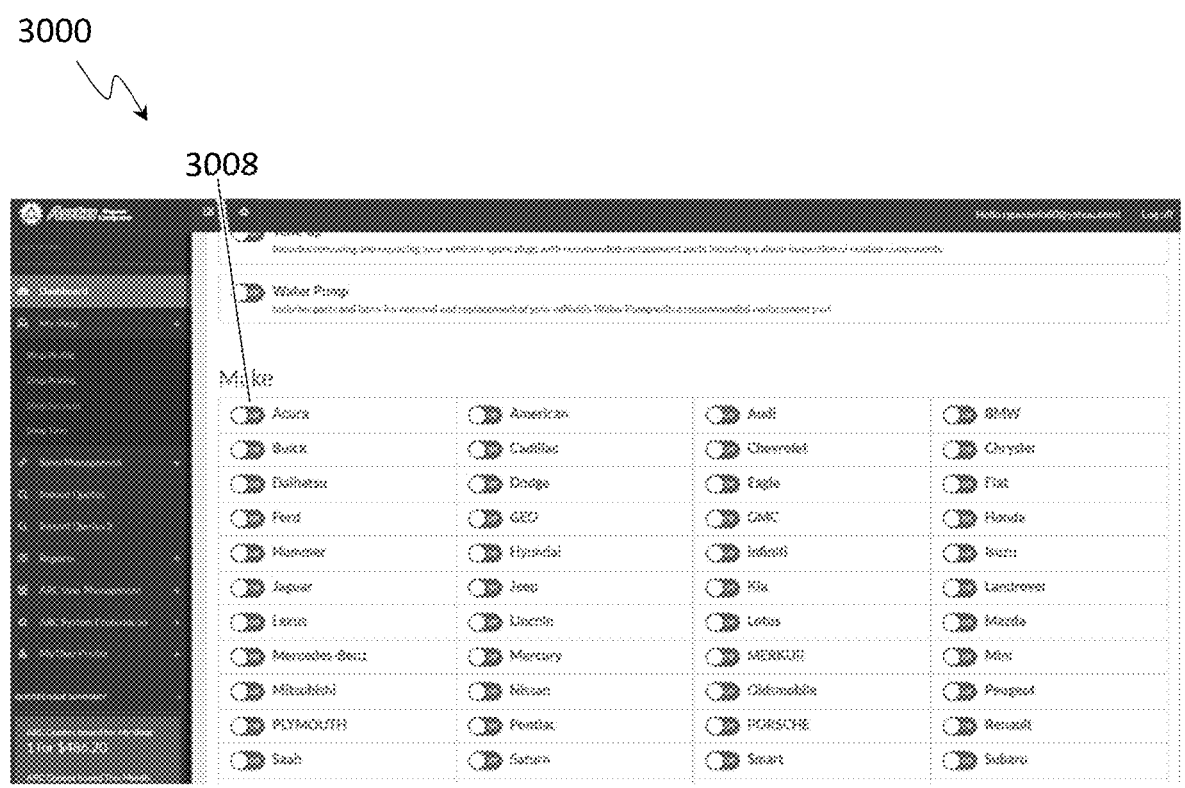
FIG. 30B shows an exemplary graphical user interface.

Turning now to exemplary FIG. 30B, an exemplary dashboard interface 3000 may show, in addition to a list of services, a list of vehicle makes 3008 that may be worked on by the shop. A user managing a shop profile may enable or disable any of the vehicle makes provided in the list, which may indicate that the shop does or does not provide servicing of that particular make of vehicle. In an exemplary embodiment, other information, such as model and year information, may also be available for a user managing a shop profile to specify. According to an exemplary embodiment, a user may also be able to pair specific makes, models, years, or other identifying information, and particular services that may be offered by the shop, which may be used to indicate that the shop provides certain services to particular kinds of vehicles, or does not provide certain services to particular kinds of vehicles.

Figure 31:
FIG. 31 shows an exemplary graphical user interface.

Turning now to exemplary FIG. 31, an exemplary dashboard interface 3100 may provide an administrator or other user of an auto repair quote platform with the option to add additional shops to the auto repair quote platform 3102. For example, according to an exemplary embodiment, an administrator of an auto repair quote platform may be able to select a type of shop to be added 3106, or may be able to input a type of shop to be added 3106, such as an instant quote shop/diagnostic shop or a part shop, if the desired type of shop is not available for them to select. An administrator or other user may be able to specify other information about the shop to be added 3108. Other information 3110 may also be available to be specified, if desired. Other steps may also be necessary in order to add a shop to the auto repair quote platform, or to make the shop visible on a public version of the auto repair quote platform; for example, according to an exemplary embodiment, contact information for the shop, such as an email address or a phone number, may have to be provided for the shop, and the shop may have to provide their consent to allow the shop to be listed on a public version of the auto repair quote platform.

In an exemplary embodiment, the auto repair quote platform may also provide recommendations 3104 to an auto repair quote platform administrator as to shops that may be added to the auto repair quote platform. For example, in an exemplary embodiment, the auto repair quote platform may be configured to look for gaps in coverage, which may for example include areas in which there is no saved shop within a certain distance, or no saved shop that provides a particular service within a certain distance. The auto repair quote platform may then be configured to provide alerts as to these gaps in coverage or underserved areas, or otherwise try to fill the gaps in coverage. For example, in FIG. 31, the auto repair quote platform has indicated to the auto repair quote platform administrator to "please add a tire shop" 3104, which may be based on, for example, no or few tire shops having been added within the surrounding area.

Figure 32:
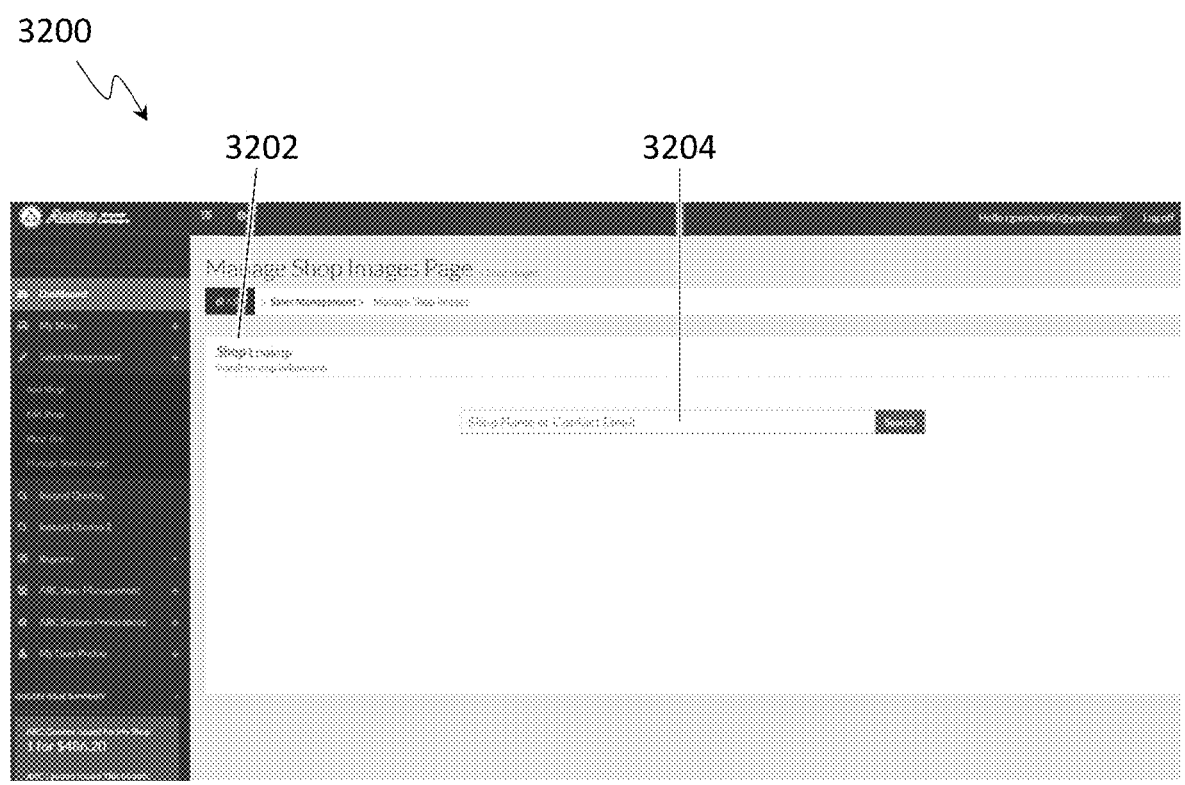
FIG. 32 shows an exemplary graphical user interface.

Turning now to exemplary FIG. 32, an exemplary dashboard interface 3200 may provide an administrator of an auto repair quote platform with the option to manage the advertising images or other images associated with each shop. In an exemplary embodiment, an administrator may first be provided with the option to browse for one or more shops to be managed 3202. For example, in an exemplary embodiment, the dashboard interface 3200 may provide an administrator with the option to search through some or all of the saved shops associated with the dashboard interface 3204; for example, an administrator may be able to search a list of associated shops by searching a list of saved shops by the name of the shop or by the contact information, such as the contact name or contact email address, of a contact associated with the shop. In another exemplary embodiment, an administrator may be able to search for or browse a list of images by, for example, entering an image to be searched or certain attributes of the image to be searched. An administrator may then be able to manage the images that are associated with a searched shop, or which are otherwise stored and searchable. In another exemplary embodiment, other data other than images, such as sound or video clips, may also be associated with a particular shop, and may likewise be searched and managed.

Figure 33A:
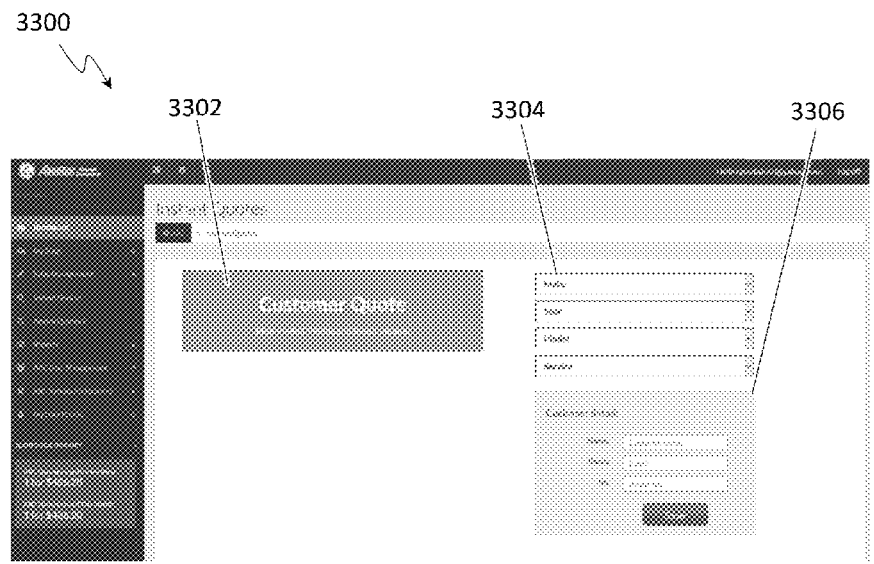
FIG. 33A shows an exemplary graphical user interface.

Turning now to exemplary FIG. 33A, an exemplary dashboard interface 3300 may provide an administrator or other user of the dashboard with the option to set a specific quote value for a particular vehicle and/or repair service 3302. In an exemplary embodiment, an administrator or shop owner may create the quote by selecting one or more attributes 3304 of the vehicle that is to be worked on, such as the make of the vehicle, the model of the vehicle, or the model year of the vehicle, and/or one or more attributes about the nature of the service to be provided, such as the type of service to be provided, the approximate cost of parts for providing a service to a specific type of vehicle having a particular make, model, or year, or the approximate cost of providing labor for such a service. In an exemplary embodiment, a selection of the service to be provided may also include selection of one or more indications of how the service is to be performed. For example, in an exemplary embodiment, a user or administrator of the exemplary dashboard interface 3300 may be able to select from different entries for the same type of repair, indicating that the service is to be performed as a typical repair, as a priority repair to be undertaken as the soonest available time, or as a house call, or as another type of repair or service, as desired. In another embodiment, a user of the exemplary dashboard interface 3300 may also be able to specify a particular mechanic or set of mechanics who may be responsible for completing the repair.

An administrator or other user of the dashboard interface 3300 may also be able to specify customer information 3306, such as a customer name, a customer email address, a customer telephone number, or other relevant information, such as the hours of the day in which the user can be contacted at that particular telephone number or notes about a particular customer. The administrator or other user of the dashboard interface 3300 may then be able to save this information once it has been entered.

In an exemplary embodiment, an administrator or other user of the dashboard interface 3300 may also be able to retrieve customer information 3306 on this screen. For example, in an embodiment, an administrator may have previously saved customer information 3306 corresponding to one or more vehicles owned by the customer, or one or more previous repairs performed on the customer's vehicles, or one or more notes about such repairs. If the administrator enters some or all of the relevant customer information 3306, such as the customer's name, or selects some or all of the relevant customer information 3306 from a list of past customers, the administrator may then have the option to retrieve the remaining stored customer information 3306, including the information about a vehicle belonging to the user. In an exemplary embodiment, one or more of the attributes saved in the customer information 3306 may affect the value of a final customer quote that is provided by the exemplary dashboard interface 3300; for example, in an exemplary embodiment, customers who have done business with a shop for a long time may receive a small discount on services provided to them by that shop, and this discount may be reflected in a quote provided by the exemplary dashboard interface 3300.

Figure 33B:
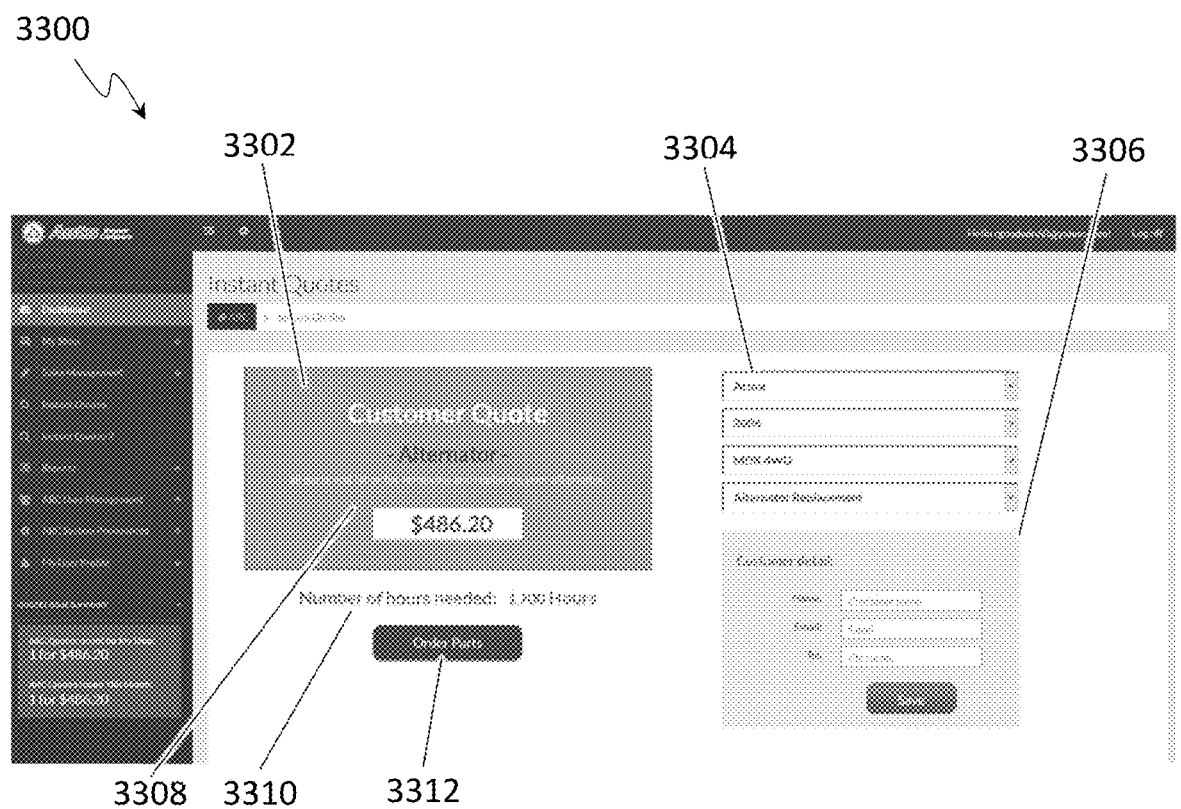
FIG. 33B shows an exemplary graphical user interface.

Turning now to exemplary FIG. 33B, once an administrator or other user of the dashboard interface 3300 has entered or selected one or more attributes 3304 of the service to be performed or the vehicle on which it is to be performed, the dashboard interface 3300 may display additional information. For example, in an exemplary embodiment, an administrator has entered, for the attributes in question 3304, that a vehicle to be worked on is a 2006 model Acura MDX 4WD, and that this vehicle requires an alternator replacement. Based on this information, a quote for the parts and labor costs involved in fixing the alternator may be generated 3308. In an exemplary embodiment, a quote 3308 that is provided to an administrator or user may provide a specific dollar value for the parts and labor costs. However, in an exemplary embodiment, the precise value of the parts and labor involved in making a specific repair may be less definite; in such an example, a maximum or minimum value of the repair may be provided as a quote 3308 instead. For example, in some embodiments, a maximum or upper-bound value may be provided to the user as a quote 3308, with the final invoice provided to the user potentially being smaller than the value provided; this may allow a user to determine whether the maximum potential cost of a repair is within their budget. In other embodiments, a minimum or lower-bound value may be provided to the user as a quote 3308, with the final invoice to the user being at least the stated value; this may allow a user to shop around to determine whether they can potentially have the repair work completed elsewhere at a lower cost, or whether they should seek alternatives to repair such as replacement of the vehicle.

A dashboard interface 3300 may also provide a more detailed breakdown 3310 of any quote 3308 provided to an administrator or user. For example, in an exemplary embodiment, a dashboard interface 3300 may provide a total time needed to complete the repair; for example, in an exemplary embodiment, the detailed breakdown 3310 may show that a particular repair may take around 1.700 hours to complete. This may be used as an indication of the number of hours that may be billed to the customer as labor. In an exemplary embodiment, different rates may be charged for different types of labor, or the labor of different workers; these distinctions may also be shown in the detailed breakdown 3310, if available and if desired. In an exemplary embodiment, the estimated time that the repair may take to complete may also be used for scheduling a time in which the repair may be completed; for example, in an exemplary embodiment wherein a particular repair is expected to take just under two hours to complete, a customer may be able to schedule the repair in a two-hour-long timeslot.

A dashboard interface 3300 may also provide an option to purchase one or more parts 3312 that may be necessary for the repair. In an exemplary embodiment, an auto repair quote system may estimate what parts will be necessary in order to complete a repair, and may then provide an administrator or user with an option to order the parts 3312. In an exemplary embodiment, an option to order the parts 3312 may be may be provided as a selectable button or other selectable option that, when selected, causes the one or more parts estimated to be necessary in order to complete the repair to be automatically ordered from one or more vendors by the auto repair quote system. In another embodiment, an option to order the parts 3312 may, when selected, provide a user with an interface through which they can order the one or more parts. This may allow the user to verify that the parts offered for sale are the correct parts needed for the repair and are not mislabeled, and may allow the user to forego ordering one or more parts if the parts are available, for example if the parts are available on the vehicle to be repaired and are salvageable. In an exemplary embodiment, parts ordering 3312 may also be integrated with scheduling; for example, in an exemplary embodiment, if parts have been ordered and are expected to arrive three days from the present day, a customer may only have the option to schedule an appointment after the three-day time period has passed.

Figure 33C:
FIG. 33C shows an exemplary graphical user interface.

Turning now to exemplary FIG. 33C, an exemplary dashboard interface 3300 may feature an alternative embodiment of a parts ordering system 3314. According to an exemplary embodiment, instead of first being prompted to order one or more parts, as in FIG. 33B, a user may first be prompted to select a parts vendor 3314. In an exemplary embodiment, the parts vendors that are displayed to the user as potential selections may be a preselected list of parts vendors, for example the most major parts vendors in operation or parts vendors most commonly purchased from, or parts vendors with which the shop has some kind of relationship. In another exemplary embodiment, the parts vendors that are displayed to the user may be, for example, parts vendors that are known to carry all of the parts that may be needed to complete the repair, or that are known to carry one or more of the parts that may be needed to complete the repair. Other part vendors may also be displayed to the user, as desired.

Once a user has selected one or more of the parts vendors 3314, the user may be taken to a screen on which they can purchase one or more of the parts needed for the repair, such as a part vendor storefront; alternatively, the parts may be automatically ordered from the selected part vendor.

According to an exemplary embodiment, once the user has selected one or more of the parts vendors 3314, the user may be taken to a portal of the one or more parts vendors 3314 that they have selected. In an exemplary embodiment, this portal may be opened in a new browser window or browser tab of the user, such that the dashboard interface 3300 remains open. The exemplary dashboard interface 3300 may store the user's credentials, and may store data regarding one or more parts that the user has selected or which are necessary to complete a repair that the user has selected. When the user accesses the portal of the one or more parts vendors 3314, the exemplary dashboard interface 3300 may automatically populate the user's credentials, as well as the part information, into the portal of the one or more parts vendors 3314. In an exemplary embodiment, this may be performed in semi-real-time, such that the user can see each form field in the portal being sequentially populated by the dashboard interface 3300. In an exemplary embodiment, the user's credentials may be auto-populated into the portal of the one or more parts vendors 3314, and then the specific part information and inquiry that the user had made to the dashboard interface 3300 may be ported over, in that order, in order to generate inventory and price quote information from the part vendor 3314. The user may then have the opportunity to order the part or parts from the interface of the one or more parts vendors 3314.

Figure 34:
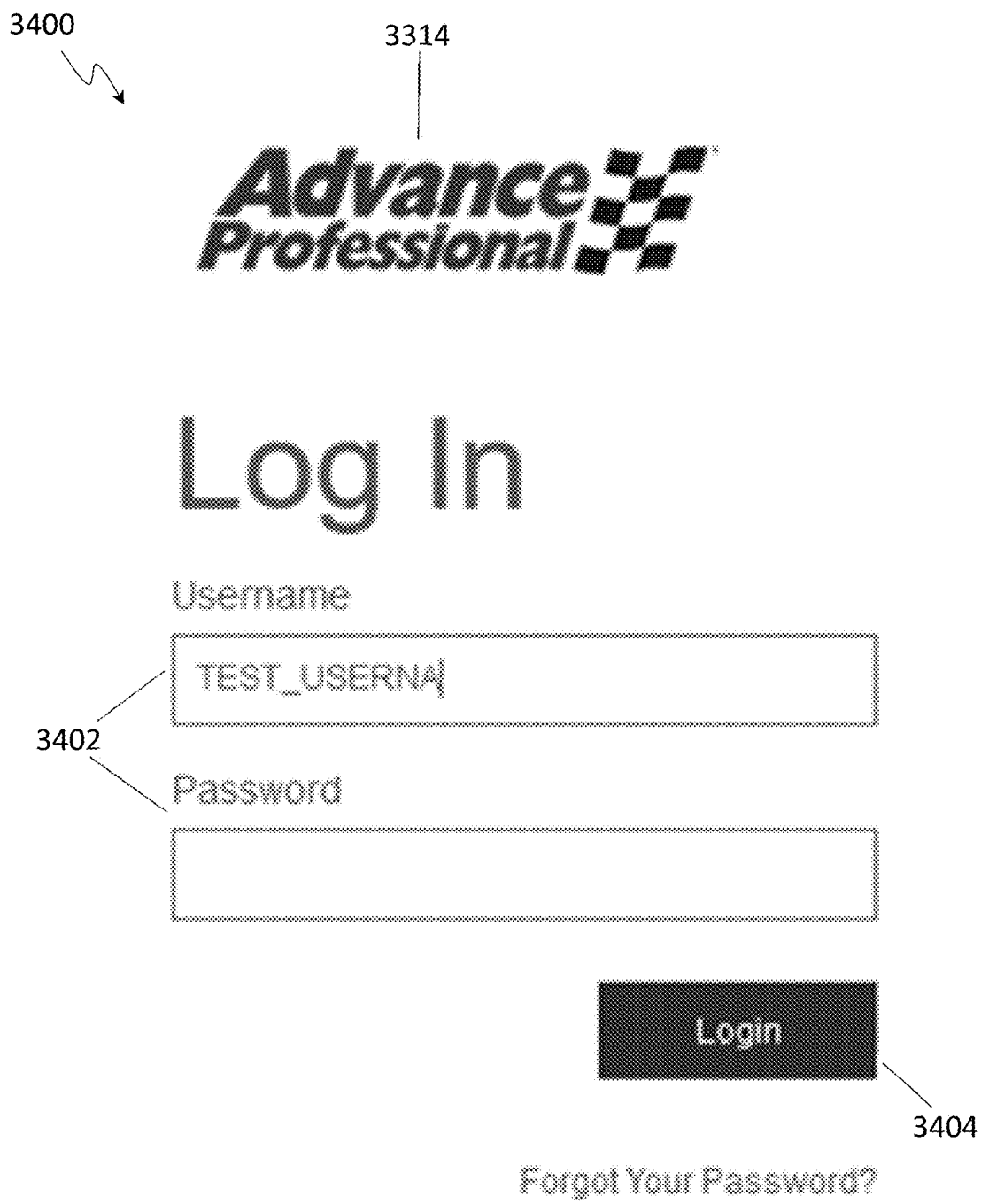
FIG. 34 shows an exemplary graphical user interface.

Such an embodiment may be illustrated in exemplary FIG. 34. According to exemplary FIG. 34, when a user selects one of the one or more parts vendors, they may be directed to the portal 3400 of the parts vendor 3314, which may be opened in a new browser tab or new browser window, such as may be desired. According to an exemplary embodiment, the user's login information 3402 may then be entered into the portal 3400 in semi-real-time; in some exemplary embodiments this may include a visible text cursor. In an exemplary embodiment, the dashboard interface 3300 may then complete login 3404 and proceed immediately to a screen where it can enter part information. In another exemplary embodiment, there may be one or more intermediate manual steps, on one or more of the portals 3400 of one or more of the parts vendors 3314, such as may be necessary or may be desired.

According to an exemplary embodiment, such a method of automatically populating credential and part information in the portal of the one or more parts vendors 3314 from the dashboard interface 3300 may solve two different problems. First, such a solution may save time in entry of the data into the portal of the one or more parts vendors. Second, such a solution may ensure that data is not shared across websites in such a form as to allow it to be easily intercepted, enhancing user security. In certain embodiments, other information may be available and may be automatically populated into the portal of the one or more parts vendors 3314; for example, it may be desirable for a user of the dashboard interface 3300 to have customers of their shop provide payment information that can be used for ordering parts from the portal of the one or more parts vendors 3314, in order to ensure that the customer provides payment for the part, and this information may be automatically populated (and may benefit from enhanced security) as well.

According to an exemplary embodiment, once this information has been populated, the user may then have the opportunity to order the part or parts from the interface of the one or more parts vendors 3314; however, in another exemplary embodiment, it may be desirable for the user to source one or more parts from local vendors or local automotive service providers (such as tires from a local tire shop) such that a repair can be completed immediately, or so that the part can be inspected before purchase, or for another reason. In an exemplary embodiment, the user may be provided with a comparison between parts that can be sourced from local vendors and parts that can be sourced from the one or more parts vendors 3314 before the user makes a purchase.

Figure 35:
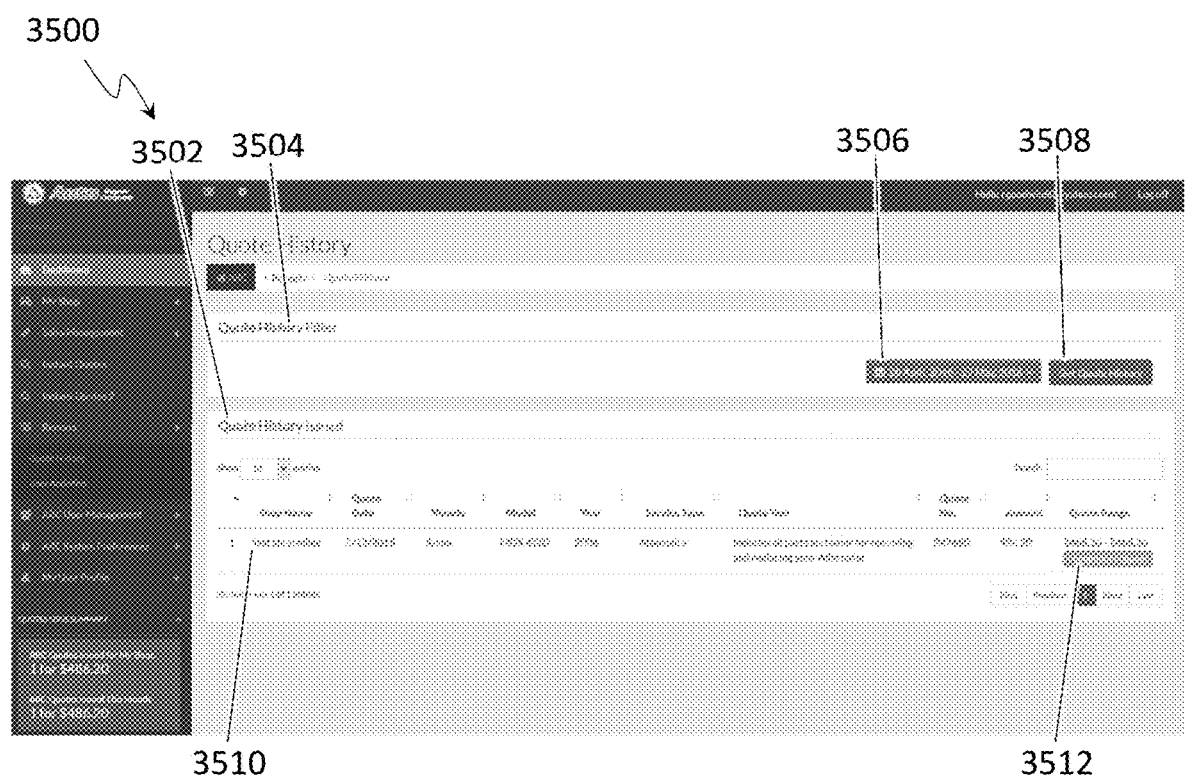
FIG. 35 shows an exemplary graphical user interface.

Turning now to exemplary FIG. 35, an exemplary dashboard interface 3500 may provide an administrator of an auto repair quote platform or other user with a list of quotes that have been provided by the auto repair quote platform in the past. Dashboard interface 3500 may include, for example, a quote history 3502 listing some or all of the quotes that had been previously issued to customers or other users of the auto repair quote platform. The quotes 3510 displayed in the quote history 3502 may include, for example, a listing of the name of the shop that generated the quote, the date on which the quote was provided, the vehicle make, model, and/or year for which the quote was provided, the type of service that was requested for the vehicle in question, some or all of the text of the quote (for example, a summary of the quote text, or the first line of the quote text, may be provided), a quote identification number, the dollar value of the quote, and a quote range. Other information, such as the identity of the requesting customer, may also be available, as a default option, as an enablable option, or upon request.

Exemplary dashboard interface 3500 may also include an option to filter quotes 3504 in the quote history 3502 by one or more criteria. For example, in an exemplary embodiment, quotes 3510 in the quote history 3502 may be filtered by the date on which they were requested, such that quotes 3510 in a particular date range 3506 are displayed to a user of the dashboard interface 3500 and other quotes 3510 are filtered out. In an exemplary embodiment, a user may perform filtering by selecting or specifying one or more criteria 3506 that will provide the basis for filtering the data, and then selecting an option to filter the data 3508. Quotes 3510 may also be selected automatically after a user inputs one or more selection criteria 3506 for the quotes 3510.

According to an exemplary embodiment, a quote 3510 may display with it a quote range. In an exemplary embodiment, a quote range may be derived from similar quotes to the quote 3510 for which the quote range is displayed. For example, in an exemplary embodiment, a quote range may be derived from the quote history 3502; in an exemplary embodiment, the quote history may be filtered for quotes 3510 that are similar to or the same as the quote 3510 for which range data has been requested. In another exemplary embodiment, a quote range may be derived from the shops of competitors or other shops, for example based on a user selecting a selectable "competitor quote" button or selectable option. For example, in an exemplary embodiment, an auto repair quote system may automatically poll one or more shops belonging to competitors in order to obtain their rates for performing a particular service, and may include the lowest-end estimate offered by a competitor's shop as a lower bound of the quote range and the highest-end estimate offered by a competitor's shop as an upper bound of the quote range. In an exemplary embodiment, auto repair quote system may distinguish "no-strings-attached" competitor quotes from "conditional" competitor quotes, with "no-strings-attached" competitor quotes being unconditional quotes and "conditional" competitor quotes being available only to customers who meet some condition (for example, being a new customer), and may exclusively search for the former or may specifically identify the latter when constructing a quote range.

Figure 36:
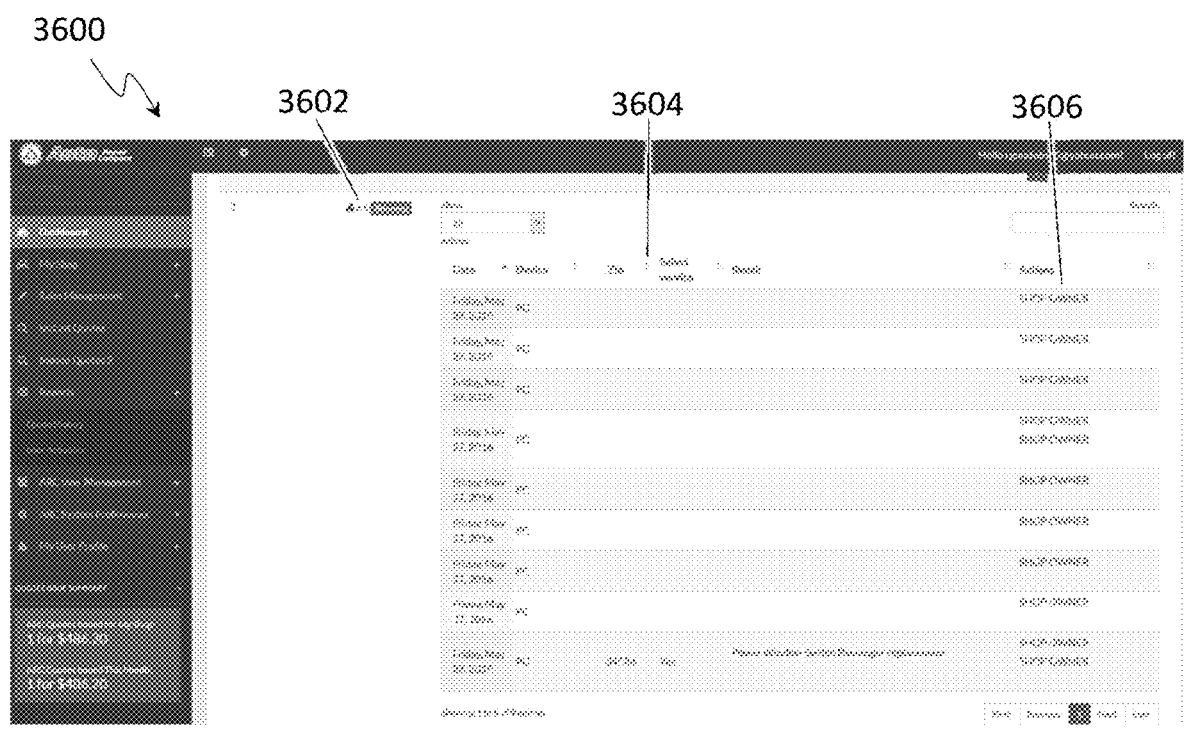
FIG. 36 shows an exemplary graphical user interface.

Turning now to exemplary FIG. 36, an exemplary dashboard interface 3600 may provide an administrator of an auto repair quote platform or other user with a list of past user activity of the auto repair quote system. For example, in an exemplary embodiment, an exemplary dashboard interface may provide information about the users of the auto repair quote system 3602, for example the number of users who have used the auto repair quote system, the number of users who have used the auto repair quote system in a particular period of time, the number of users who have previously used the auto repair quote system and are now returning to use it again, the number of new users or new customers, or the number of users who are currently logged in or who are otherwise currently using the auto repair quote system. In some exemplary embodiments, users may be identified or identifiable, may be identified by the type of user that they are (for example, shop owner or customer), or may be anonymized, as desired.

Exemplary dashboard interface 3600 may also include information about the activities of the one or more user 3602, for example users that have interacted with the auto repair quote system in some meaningful way. For example, an exemplary dashboard interface 3600 may provide a log of which users have logged into and interacted with the auto repair quote system; this log may include, for example, the type of user that has interacted with the system 3606 (or, in some embodiments, the identity of the user that has interacted with the system), as well as information about the nature of their interaction with the system 3604. Information about the nature of each user's interaction with the system 3604 may include, for example, the date of interaction, the type of device or device ID (IP or MAC address, etc.) that was used to interact with the system, the approximate location (for example, the ZIP code) of the user, as well as information about any services that the user requested or any other changes of importance that the user may have made. For example, in an exemplary embodiment, a user accessing the auto repair quote system may be identified as a shop owner, may have accessed the auto repair quote system on Friday, May 27, 2016, via a PC, from an IP address corresponding to a ZIP code of 34684, may have accessed the auto repair quote system in order to select a service to be completed by one or more of the shops on the auto repair quote system, and may have identified the specific type of service to be completed (a power window switch passenger replacement). Other interactions may be shown as essentially blank, which may indicate that a user was browsing the site without requesting a service.

Figure 37:
FIG. 37 shows an exemplary graphical user interface.

Turning now to exemplary FIG. 37, an exemplary dashboard interface 3700 showing an exemplary user profile page may be displayed. According to an exemplary embodiment, some or all of the users of a dashboard interface, such as administrators, shop owners or even customers, may have a persistent user profile associated with an account that provides identifying information or custom settings, or other information, as desired. Under a personal settings heading 3702, a user may be able to set certain information 3704, such as a name, an address, or certain contact information associated with the user. In another exemplary embodiment, a user may opt to, and may have the option to, remain anonymous apart from the information that the user supplies to log in. Under a security setting heading 3706, a user may be able to set or change certain security information, such as a password associated with their user account. In an exemplary embodiment, a user may also be able to add, edit, or delete saved credential information for one or more portals of one or more parts vendors under a security setting heading 3706.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing auto repair quotes, comprising:
   (a) storing a platform of providers with firm quotes, the platform of providers with firm quotes comprising a plurality of service provider profiles,
      each of the plurality of service provider profiles being associated with at least one of a plurality of automotive service providers,
      each of the plurality of service provider profiles comprising
         at least one service provided by the automotive service provider and quote information provided by the automotive service provider and
         corresponding to that particular service,
      and wherein each of the plurality of service provider profiles is configured to be accessed and edited directly through a shop owner section by the automotive service provider with which it is associated;
   (b) receiving a service request from a customer identifying a selected service;
   (c) processing the service request, for each automotive service provider having the identified service stored in the aggregator database, wherein processing comprises determining if there is quote information corresponding to the identified service and each automotive service provider, and if so displaying said quote information;
   (d) receiving a customer-selected automotive service provider;
   (e) booking a service appointment at the customer-selected automotive service provider for the identified service request; and
   (f) ordering one or more parts from at least one parts supplier, wherein the step of ordering one or more parts from at least one parts supplier comprises:
      authenticating an account credential of the automotive service provider through a browser;
      navigating to a web portal of the at least one parts supplier;
      automatically entering a web portal account credential of the automotive service provider into the web portal using automated typing, such that each character of the web portal account credential is entered individually into the web portal;
      automatically retrieving part information on the one or more parts from the server and automatically populating the part information in the web portal; and
      purchasing the one or more parts.

2. The method according to claim 1, wherein each stored service is selected from a set of predefined services.

3. The method according to claim 1, wherein the quote information is individual to each automotive service provider.

4. The method according to claim 1, wherein the quote information is individual to each service provider profile.

5. The method according to claim 1, wherein each stored service is associated with at least one of a particular make, model, and year of automobile.

6. The method according to claim 1, wherein the service request from a customer further includes at least one of the make, model, and year of an automobile.

7. The method according to claim 1, wherein the step of navigating to a web portal of at least one parts supplier is preceded by creating a new instance of the browser.

8. The method of claim 1, further comprising:
   maintaining, an aggregator database of updated available service provider appointment data that is associated with and individual to each automotive service provider, wherein maintaining the database comprises:
      receiving scheduling information for an automotive service provider, said automotive service provider scheduling information being provided in the form of available unfilled timeslots and automotive service provider operating hours,
      storing in the aggregator database, the received automotive service provider scheduling information, and associating the received automotive service provider scheduling information with an automotive service provider,
      receiving new automotive service provider scheduling information, and
      updating the available service provider appointment data in the aggregator database by modifying at least one unfilled timeslot to a filled timeslot.

9. The method according to claim 8, wherein the new automotive service provider scheduling information received indicates a booked appointment.

10. The method according to claim 8, wherein the filled timeslot indicates a booked appointment.

11. The method of claim 1, wherein the step of processing the service request comprises:
    generating, from the stored automotive service provider scheduling information, a plurality of individual start times, and
    displaying the plurality of individual start times; and
    receiving a customer-selected start time.

12. The method of claim 1, wherein the step of booking the service appointment comprises booking the service appointment at the customer-selected start time and further comprises:
- receiving a customer address for an electronic communication,
- sending an electronic communication providing information on the appointment, and
- updating the available service provider appointment data in the aggregator database by modifying at least one unfilled timeslot to a filled timeslot.

13. The method according to claim 12, wherein the filled timeslot indicates a booked appointment.

\* \* \* \* \*